(12) United States Patent
Caskey et al.

(10) Patent No.: US 6,196,688 B1
(45) Date of Patent: *Mar. 6, 2001

(54) ELEMENTAL SEMICONDUCTOR MIRROR

(75) Inventors: Gregory T. Caskey; Niall R. Lynam, both of Holland, MI (US); Bryant P. Hichwa, Santa Rosa, CA (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,156

(22) Filed: Mar. 23, 2000

Related U.S. Application Data

(62) Division of application No. 09/313,152, filed on May 17, 1999, now Pat. No. 6,065,840, which is a continuation of application No. 09/074,810, filed on May 8, 1998, which is a division of application No. 08/409,279, filed on Mar. 23, 1995, now Pat. No. 5,751,489, which is a division of application No. 07/700,760, filed on May 15, 1991, now Pat. No. 5,535,056.

(51) Int. Cl.$^7$ ...................................................... G02B 5/08
(52) U.S. Cl. .......................... 359/603; 359/604; 359/608
(58) Field of Search .................................. 359/603, 604, 359/608, 584, 585, 586, 587, 588, 589

(56) References Cited

U.S. PATENT DOCUMENTS

| | | | |
|---|---|---|---|
| 2,427,689 | 9/1947 | Osterberg et al. | 359/584 |
| 2,478,817 | 8/1949 | Gaiser | 63/33 |
| 2,519,722 | 8/1950 | Turner | 63/33 |
| 2,590,906 | 4/1952 | Tripp | 359/582 |
| 2,715,352 | 8/1955 | Jobe | 359/584 |
| 2,750,832 | 6/1956 | Morgan | 359/584 |
| 2,999,034 | 9/1961 | Heidenhain | 351/211 |
| 3,412,575 | 11/1968 | Feldman et al. | 359/585 |
| 3,556,640 | 1/1971 | Austin | 427/167 |
| 3,559,090 | 1/1971 | Refermat et al. | 63/33 |
| 3,652,318 | 3/1972 | Heins | 359/582 |
| 3,671,286 | 6/1972 | Fischell | 389/587 |
| 3,679,291 | 7/1972 | Apfel et al. | 359/587 |

(List continued on next page.)

FOREIGN PATENT DOCUMENTS

| | | |
|---|---|---|
| 3436016 | 10/1984 | (DE) . |
| 373265 | 11/1939 | (IT) . |
| 223601 | 9/1988 | (JP) . |

*Primary Examiner*—Mohammad Y. Sikder
(74) *Attorney, Agent, or Firm*—Van Dyke, Gardner, Linn & Burkhart, LLP

(57) ABSTRACT

A mirror having a high luminous reflectance of at least about 60% of incident light at the wavelength region of about 550 nanometers and being acromatic includes a substrate coated with a reflector comprising a multilayer thin film stack. The thin film stack comprises a first thin film layer of an elemental semiconductor which is closest to the first surface of the glass substrate and has a refractive index of greater than 3.0, a second thin film layer which is farthest from the first surface of the glass substrate, and a third thin film layer disposed between the first thin film layer and the second thin film layer, the third thin film layer having a refractive index between about 1.3 and 2.7, the second thin film layer having a refractive index greater than the third thin film layer. A light absorbing coating is included on at least one surface of the substrate and a layer of the reflector, the light absorbing coating absorbing light transmitted by the reflector coated substrate. The elemental semiconductor may comprise silicon or germanium. The light absorbing coating may comprise one of a paint, a lacquer, a tape, a ceramic, a hot melt plastic, a resinous plastic, a plastisol, or an epoxy material.

29 Claims, 7 Drawing Sheets

U.S. PATENT DOCUMENTS

| | | | |
|---|---|---|---|
| 3,826,728 | 7/1974 | Chambers et al. | 209/198 |
| 3,834,793 | 9/1974 | McConnell et al. | 359/289 |
| 3,925,182 | 12/1975 | Carmichael et al. | 204/192 |
| 3,926,508 | 12/1975 | Harmsen et al. | 359/884 |
| 3,934,061 | 1/1976 | Keck et al. | 427/163 |
| 4,032,954 | 6/1977 | Grinberg et al. | 357/30 |
| 4,048,039 | 9/1977 | Daxinger | 204/192 |
| 4,144,684 | 3/1979 | Kirkbride et al. | 52/204 |
| 4,320,155 | 3/1982 | Gillery | 65/60 |
| 4,322,130 | 3/1982 | Ito et al. | 427/160 |
| 4,388,344 | 6/1983 | Shuskus et al. | 359/584 |
| 4,444,467 | 4/1984 | Shuskus et al. | 359/846 |
| 4,490,227 | 12/1984 | Bitter | 204/192 |
| 4,490,228 | 12/1984 | Bodin et al. | 204/192 |
| 4,545,646 | 10/1985 | Chern et al. | 359/569 |
| 4,627,732 | 12/1986 | Braun et al. | 356/350 |
| 4,673,248 | 6/1987 | Taguchi et al. | 359/584 |
| 4,715,879 | 12/1987 | Schmitte et al. | 65/60.2 |
| 4,805,989 | 2/1989 | Nakajima | 359/584 |
| 4,857,094 | 8/1989 | Groth et al. | 65/60.2 |
| 4,870,322 | 9/1989 | Matsudaira et al. | 313/506 |
| 4,921,331 | 5/1990 | Nakajima | 359/584 |
| 4,955,705 | 9/1990 | Nakajima et al. | 359/642 |
| 5,007,710 | 4/1991 | Nakajima et al. | 359/642 |
| 5,072,109 | 12/1991 | Aguilera et al. | 359/359 |
| 5,171,414 | 12/1992 | Amberger et al. | 204/192 |
| 5,179,471 | 1/1993 | Caskey et al. | 359/603 |
| 5,181,141 | 1/1993 | Sato et al. | 359/580 |
| 5,341,238 | 8/1994 | Trost et al. | 359/359 |
| 5,535,056 | 7/1996 | Caskey et al. | 359/603 |
| 5,751,489 | 5/1998 | Caskey et al. | 359/603 |

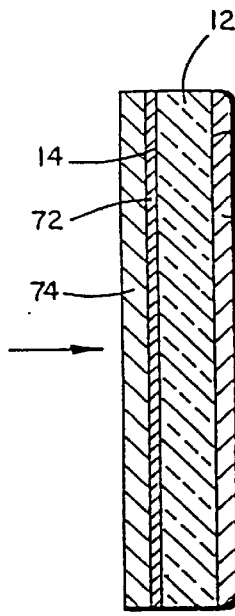 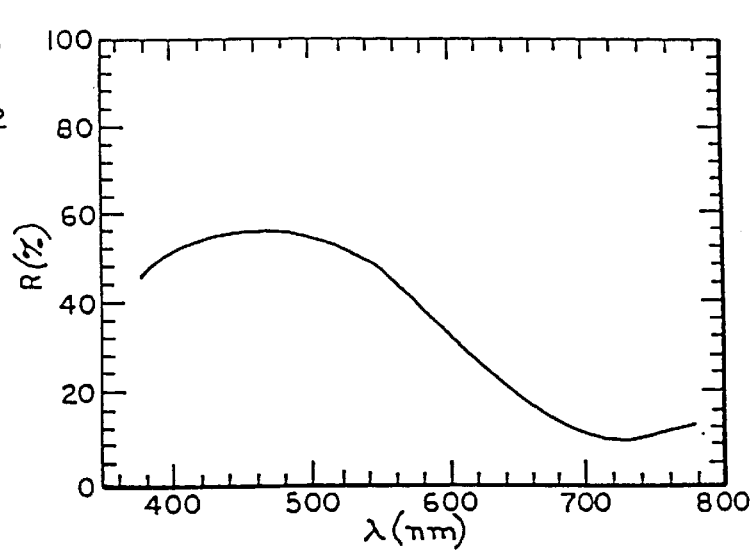
FIG.14  FIG.15
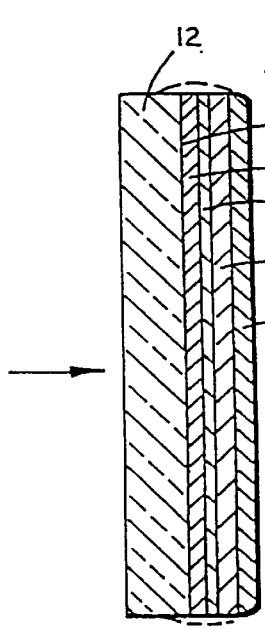 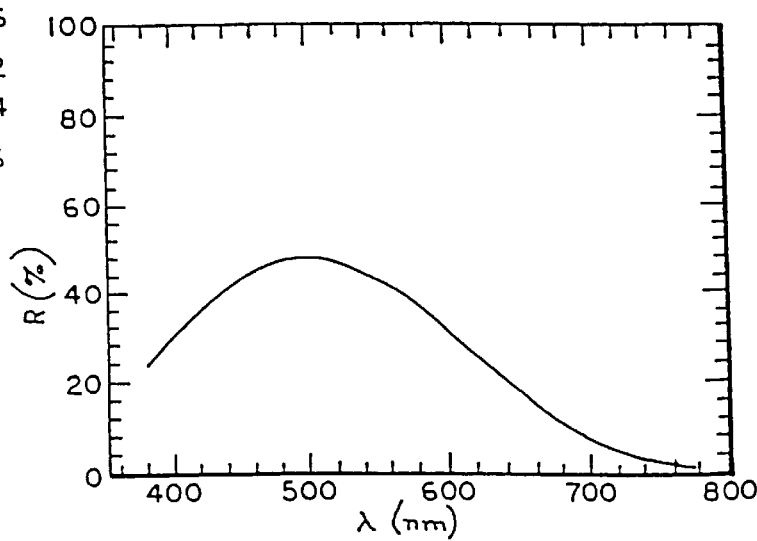
FIG.16  FIG.17

ELEMENTAL SEMICONDUCTOR MIRROR

CROSS REFERENCE TO RELATED APPLICATION

This application is a division of application Ser. No. 09/313,152, filed May 17, 1999, by Gregory T. Caskey, Niall R. Lynam and Bryant P. Hichwa for ELEMENTAL SEMICONDUCTOR MIRROR FOR VEHICLES AND METHOD FOR MAKING SAME, now U.S. Pat. No. 6,065,840, which is a continuation of application Ser. No. 09/074,810, filed on May 8, 1998, which is a division of Ser. No. 08/409,279, filed Mar. 23, 1995, now U.S. Pat. No. 5,751,489, which is a division of application Ser. No. 07/700,760, filed May 15, 1991, now U.S. Pat. No. 5,535,056.

BACKGROUND OF THE INVENTION

This invention relates to vehicular mirrors and, more particularly, to rearview mirrors for vehicles which incorporate a thin layer of an elemental semiconductor to provide luminous reflectance levels adapted to reduce glare while maintaining visibility.

Vehicular rearview mirrors, especially for the exterior of an automobile or truck, are broadly classified as either spectrally nonselective, i.e., achromatic, metallic or silvery in appearance, or spectrally selective, i.e., those which use light interference to enhance reflectance in some portion of the visible wavelength spectrum relative to other portions. For example, a commonly available first surface, chromium coated glass mirror is a spectrally nonselective or metallic appearing mirror. Commercially available blue mirrors which enhance reflection in the blue region of the visible spectrum are exemplary of spectrally selective mirrors.

It is desirable in both spectrally nonselective and selective vehicular mirrors to reduce glare and provide an antidazzling effect while maintaining sufficient luminous reflectance to provide a proper image. Such an image is bright enough that the driver can quickly, accurately and easily gather information about the environment even in low light level conditions, but not so bright as to act as a source of glare from following headlights at night. Luminous reflectance of rearview mirrors is measured by using a light source which models that from a headlight and by using a detector with a filter which mimics the spectral selectivity of the human eye in its day adapted (photopic) mode. Measurements of luminous reflectance are performed in accordance with SAE (Society of Automotive Engineers) Recommended Practice J964 for measurement of rearview mirror reflectivity. In the United States, governmental regulations such as Federal Motor Safety Standard 111 require a minimum mirror luminous reflectance of at least 35%. In Europe, European Economic Community Council Directive 71/127/EEC requires a similar minimum luminous reflectance of at least 40% for vehicular mirrors. On the other hand, a maximum luminous reflectance of 60% to 65% has been found acceptable for glare reducing rearview mirrors as compared to the luminous reflectance of a full reflectivity mirror of about 80% to 90% of the incident light.

In addition, spectrally selective mirrors may be used to further optimize human sight in low light level or night conditions. As indicated above, luminous mirror reflectance depends both on the type of light source projecting light on a mirror as well as the type of detector which senses the reflected light. The human eye is a detector which adapts to various levels of ambient light by changing its sensitivity to various colors. During the day when light is abundant, human eye sensitivity is highest in the green spectral regions. As light level drops, however, the peak eye sensitivity moves toward the shorter, blue wavelengths. Since headlights have a spectral emission that is strong in longer yellow wavelengths but weaker in blue, a glare-reducing or antidazzling mirror which optimizes low light vision should accentuate reflectance in the blue regions [400 to 500 nm. wavelengths or thereabouts] where the eye is most sensitive but reduce reflectance in the yellow regions [above 560 nm. wavelengths or thereabouts] thereby reducing headlight reflectance. Such a mirror is, therefore, spectrally selective and blue in color.

In the past, both spectrally selective and spectrally nonselective vehicular mirrors have employed coatings of metal, dielectric materials or combinations thereof on glass or other substrates. While such metal/dielectric layers have functioned adequately, various embodiments have been expensive to manufacture due to the necessary coating, cutting, bending and heating procedures. Moreover, in many prior known mirrors, substantial thicknesses of metal or dielectric coatings have been required to provide optical thicknesses necessary for proper reflectance or spectral selectivity. Increased thicknesses require additional material and add expense to production costs.

Also, many vehicle manufacturers specify first surface mirrors on the vehicle exterior in order to reduce ghost or secondary reflections and images. In such mirrors, the reflective coatings are exposed to the elements and can degrade more quickly than second surface mirrors.

Moreover, the manufacturing processes necessary to make prior known spectrally selective and nonselective mirrors have often required costly, time consuming procedures which require heating and bending of glass prior to applying any coating. As is well known, the coating of a curved substrate with a uniform thickness thin layer is more difficult, time consuming and expensive than coating flat glass because of special fixturing required and the difficulties of cleaning curved surfaces, for example. Again, such procedures increase production costs.

Further, the production of prior known spectrally selective and nonselective mirrors has often required greatly differing combinations of layers and materials. The use of one or a few types of layers to produce spectrally selective as well as nonselective vehicular mirrors was difficult. Hence, modifying production techniques to incorporate the varying types of materials and to switch between the differing materials at different times reduced production efficiency and added to costs.

Thus, the need has remained for a commercially acceptable vehicular mirror which can be economically produced from a material which provides both spectrally selective and nonselective mirrors, allows use on both first and second surface mirrors, and provides luminous reflectances meeting worldwide minimum safety standards while maintaining desired glare reduction.

SUMMARY OF THE INVENTION

Accordingly, the present invention provides a solution to the above needs with a glare-reducing mirror for vehicles having a luminous reflectance of between about 30% and 65% to achieve consumer and regulatory acceptability with either spectrally selective or nonselective mirrors. The invention achieves this result through the use of a thin layer of an elemental semiconductor which may be used alone in varying thicknesses or combined with interference coatings preferably of a dielectric material, thereby producing both spectrally selective and nonselective mirrors.

Use of elemental semiconductors provides high refractive indexes allowing suitable optical thicknesses with thinner material layers and, therefore, increased production economies. Optical thickness is important in the present invention because optical thickness controls the interference of light which produces the desired spectral response in the mirrors herein. In addition, manufacturing. flexibility is provided since the semiconductor layers can be provided in varying thicknesses for use on either first or second surface mirrors, for spectral selectivity or nonselectivity, for combination with interference coatings to produce spectrally selective mirrors as well, or for combination with dielectric layers in additional coatings which reduce secondary reflections from the mirror. In addition, the semiconductor and other layers are easily coated on flat glass and subsequently heated to improve their scratch resistance and hardness or heated and bent to produce a curved mirror, all without reducing reflective qualities.

Conventional mirror coatings of metal like silver, aluminum, chromium, titanium, stainless steel or the like do not withstand elevated temperatures in manufacturing or use (e.g., temperatures encountered during bending operations) whereas coatings in the present invention do. Nor do the conventional coatings withstand such conditions even after being deposited in combination with other thin films to form multilayer stacks. Therefore, the present invention utilizes elemental semiconductors such as silicon or germanium as thin film materials that retain beneficial cosmetic, reflective and mechanical (i.e., does not crack or flake off the substrate) properties even after heating to temperatures sufficient to permit bending of the glass substrate.

Some metals, like silver and aluminum, are used only in second-surface vehicular mirror constructions because, without proper protection, they deteriorate rapidly in out-of-doors environments. Such coatings are, therefore, over-coated with paint, tape or the like to protect the metal from exposure to the environment. Scratch resistance is thereby provided by the substrate glass. First surface mirrors use metals like chromium, titanium, stainless steel or the like because such coatings adequately resist scratches and wear and because they do not deteriorate as rapidly as silver and aluminum when exposed to the environment typically encountered outside automobiles or trucks. The present invention is surprisingly and beneficially more resistant to scratching and wear than the conventional mirror coatings and so provides consumer appreciable benefit in first surface embodiments over conventional first surface mirrors in that the coatings of this invention are more rugged when exposed to abrasives such as are found in car washes and the like.

In one form, the invention is a glare-reducing mirror for vehicles comprising a substrate having front and rear surfaces and a thin layer of an elemental semiconductor on one surface of the substrate. The elemental semiconductor coating has an index of refraction of at least 3 and an optical thickness of at least about 275 angstroms. The thin elemental semiconductor layer provides the mirror with a luminous light reflectance of at least about 30% of the light incident thereon from the direction of the front surface of the substrate.

Preferably, the elemental semiconductor is silicon or germanium. When silicon is used in an optical thickness of between about 345 and 2400 angstroms, the elemental semiconductor layer provides a spectrally nonselective mirror with luminous light reflectance between about 30% and 65%. When germanium is used in an optical thickness of between about 275 and 2400 angstroms, a similar spectrally nonselective mirror is produced. However, when the thickness of the elemental semiconductor layer is increased to between about 2400 and 10,000 angstroms, the mirror becomes discernibly spectrally selective.

In another aspect of the invention, a spectrally selective, glare-reducing mirror is provided including a substrate having front and rear surfaces and a single, thin layer of an elemental semiconductor and a single, thin, transparent, interference coating on the elemental semiconductor thin layer. Again, the elemental semiconductor thin layer has an index of refraction of at least 3 and an optical thickness of at least about 275 angstroms. The interference coating has an index of refraction within the range of between about 1.3 and 2.7, an optical thickness of at least about 500 angstroms, and is positioned closest to a source of incident light to be reflected by the mirror. Such mirror has a luminous reflectance of at least about 30% of the light incident thereon from the direction of the front substrate surface.

In the above mirror, thinner interference coatings than about 500 angstroms do not give appreciable spectral selectivity. Optical thicknesses between about 1600 and 2800 angstroms are preferred because they result in good spectral selectivity. Above 2800 angstroms, spectral selectivity is maintained with a more complex pattern of maxima and minima appearing in the spectral reflectance.

In a preferred form, the elemental semiconductor thin layer may be applied to the front substrate surface with the interference coating being applied over the semiconductor thin layer. Alternately, when the substrate is transparent, the interference coating may be applied to the substrate rear surface with the semiconductor thin layer being applied over the interference coating to the rear of the substrate. In either case, the elemental semiconductor thin layer may be selected from the group including silicon and germanium while the interference coating is preferably selected from the group including silicon dioxide and silicon nitride. With silicon in an optical thickness between about 345 and 1200 angstroms, and an interference coating of silicon dioxide or silicon nitride having an optical thickness within the range of between about 1600 and 2800 angstroms, the mirror provides a blue colored reflectance.

In all cases, a light absorbing layer may be applied to the rear of the substrate or to the last coating on the coated mirror to prevent secondary reflections that would detract from the performance of the overall mirror. Such layer may be chosen to provide anti-scatter protection for pieces or fragments of the substrate in the event that the substrate is broken. Alternately, to reduce secondary reflections, additional thin film layers of an elemental semiconductor and a dielectric may be coated on the front or rear surfaces of the other coating layers for opacification or near-opacification of the mirror.

In yet another aspect of the invention, a method for manufacturing a glare-reducing mirror for vehicles includes providing a sheet of flat glass having front and rear surfaces, coating one surface of the sheet with a thin layer of an elemental semiconductor having an index of refraction of at least 3 and a desired optical thickness of at least about 275 angstroms, heating the coated glass to a temperature sufficient to allow bending of the coated glass and bending the heated, coated glass to a desired curvature. Alternately, a thin layer of dielectric material may be coated on the elemental semiconductor layer prior to heating and bending thereby producing a spectrally selective mirror.

Alternatively, the rear surface of the substrate may be coated with a thin layer of dielectric material followed by the thin elemental semiconductor layer prior to heating and bending. In each of these cases, the subsequent heating and bending does not significantly degrade the reflective characteristics of the coated mirror.

In other aspects, the method for manufacturing a glare-reducing mirror for vehicles includes providing a sheet of flat glass, coating one surface of the sheet with an elemental semiconductor layer as described above, and heating the coated glass for a limited period of time to cause the semiconductor coating to be environmentally resilient, hard and scratch resistant. Alternately, the flat glass may be heated prior to application of the semiconductor coating to also produce the hard, scratch resistant coating result.

In addition, the present method includes coating a flat glass sheet with an elemental semiconductor coating, or an interference coating such as silicon nitride, or coatings of both, on either the front or rear surfaces of the glass, followed by heating and bending the coated glass. After cooling, if only one coating has been applied, the other material can subsequently be coated in a thin layer to produce a glare-reducing mirror.

Accordingly, the present invention provides both spectrally selective and nonselective mirrors using a thin layer of an elemental semiconductor which are more economical to produce while providing commercially acceptable luminous reflectances which also meet minimum governmental standards. The thin elemental semiconductor layer provides environmental resilience and flexibility for use either alone or with dielectric interference coatings resulting in either first or second surface and spectrally selective or nonselective mirrors as desired. Moreover, such coatings may be combined with dielectric layers and other elemental semiconductor layers to produce spectrally selective mirrors, or to produce either spectrally selective or nonselective mirrors that are opacified using thin films. All these stacks of coatings can be heated to improve scratch resistance, or coated on a heated substrate to achieve the same effect, or heated and bent to form curved mirrors.

These and other objects, advantages, purposes and features of the invention will become more apparent from a study of the following description taken in conjunction with the drawings.

BRIEF DESCRIPTION OF THE DRAWINGS

FIG. 14 is a sectional view of an ninth embodiment of a spectrally selective vehicular mirror of the present invention;

FIG. 15 is a graph of the spectral response for the mirror of FIG. 14 including a coating of silicon of about 1200 angstroms optical thickness on glass followed by a layer of silicon nitride having an optical thickness of about 2000 angstroms;

FIG. 16 is a sectional view of a tenth embodiment of a second surface spectrally selective vehicular mirror of the present invention;

FIG. 17 is a graph of the spectral response for the mirror of FIG. 16 including a coating of silicon nitride having an optical thickness of about 2200 angstroms on glass followed by a layer of silicon having an optical thickness of about 1200 angstroms and a layer of silicon nitride having an optical thickness of about 2400 angstroms;

DESCRIPTION OF THE PREFERRED EMBODIMENTS

Figure 1:
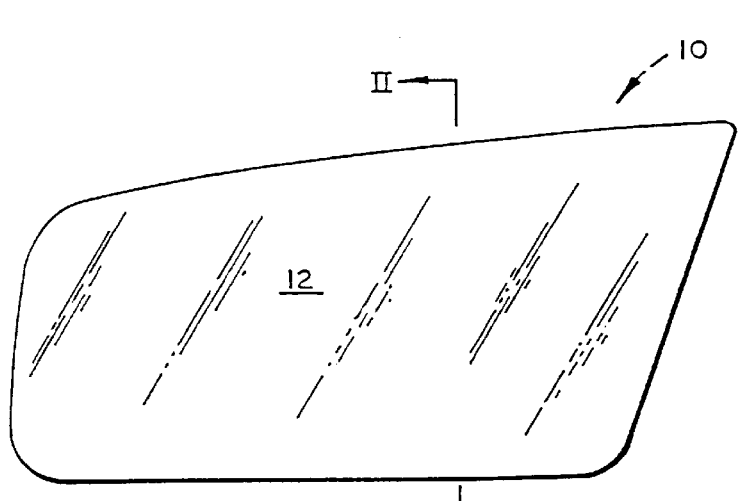
FIG. 1 is a front view of one form of a spectrally nonselective glare-reducing vehicular mirror of the present invention.
Figure 2:
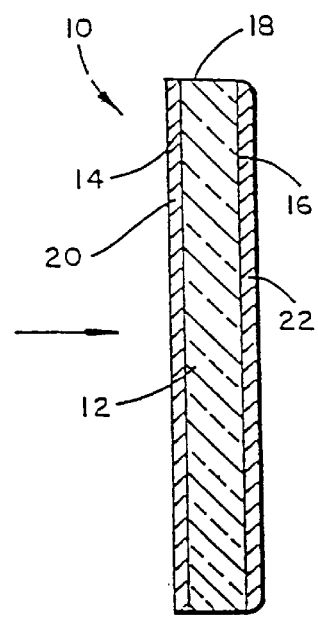
FIG. 2 is a sectional view of the mirror of FIG. 1 taken along plane II—II.

Referring now to the drawings in greater detail, FIGS. 1 and 2 illustrate a first embodiment 10 of the glare-reducing mirror of the present invention adapted for use as an exterior, rearview vehicular mirror for automobiles, trucks or the like. Mirror 10 includes a glass substrate 12 formed from optically clear, transparent, float glass or, alternately, tinted or light absorbing glass cut to the shape of an exterior rearview mirror, in this case, one adapted for use on the driver's/left side of a vehicle. In addition, optically clear or tinted or light absorbing plastic substrates formed from polycarbonate, acrylic, polystyrene, allyl diglycol carbonate, styrene acrylonitrile, polysulfone and the like may be used in this invention. Preferably, substrate 12 has flat or planar front (or first) and rear (or second) surfaces 14, 16 which are generally parallel to one another and a peripheral edge surface 18, although the invention can be used on glass or other substrates having nonparallel surfaces forming prismatic elements typically used in day/night rearview mirror applications, or on glass surfaces that are nonparallel for other reasons. Alternately, substrate 12 may be bent or curved to a desired radius as described below.

As is shown best in FIG. 2, a thin layer 20 of a partially transparent, high refractive index, elemental semiconductor preferably selected from silicon and germanium is coated to a desired thickness on the front or first surface 14 of glass substrate 12. The thickness of layer 20 has been exaggerated for clarity as are the thicknesses of the other coatings and substrates for all the embodiments herein. The viewing direction for the various mirrors is indicated by the arrow in the figure for each embodiment. On the rear surface 16, a protective coating 22 of light absorbing material is applied over the entire surface to absorb and prevent reflection of light transmitted through the semiconductor layer 20 and substrate 12 and prevent secondary reflections which would detract from the reflective quality of mirror 10.

The elemental semiconductor layer 20 of mirror 10 is preferably a vacuum sputtered coating of silicon having an optical thickness within the range of between about 345 and 2400 angstroms. This corresponds to a coating thickness of between about 85 and 600 angstroms at an index of refraction (n) of 4. Specifically, an optical thickness of between about 400 and 2400 angstroms of silicon elemental semiconductor may be coated onto flat or curved substrate 12. This corresponds to a coating thickness of between about 100 and 600 angstroms at n=4. The preferred range of optical thickness of elemental silicon for mirror 10 is between about 800 and 1800 angstroms. An optical thickness of about 960 angstroms is most preferred corresponding to a coating thickness of about 240 angstroms at n=4. After washing the substrate by conventionally known, standard glass substrate washing methods, various types of vacuum deposition techniques may be used. Preferably, direct current (DC) magnetron vacuum sputtering from a silicon elemental semiconductor target preferably doped with another element or combined with a metal to improve electrical conductivity is used. For example, a silicon sputtering target doped with 200 parts per million (ppm) phosphorous may be used, as can a sputtering target of silicon doped with aluminum. The level of 200 ppm phosphorous is near the soluability limit in silicon. Electrical conductivity is generally lower for smaller concentrations of phosphorous. Thus, 200 ppm is preferred as it provides good electrical conductivity for the silicon sputtering target, which is especially useful when DC sputtering. If the aluminum concentration in the sputtering target is kept below about 15%, it has been found that subsequent heating and bending processes do not cause any significant loss of reflectance from the mirror and, in fact, increase the resulting reflectance somewhat. Lower target concentrations of aluminum also result in acceptable performance for silicon elemental semiconductor films. Aluminum concentrations above about 15% in sputtering targets of elemental silicon are acceptable for some applications in the present invention where exposure to temperatures above about 200° C. is not anticipated. However, the resulting reflectance loss with such higher aluminum concentrations makes such concentrations less preferred for most embodiments of this invention. Also, it has been found that films sputtered from phosphorous doped silicon targets are less resistant to salt spray damage during environmental testing. Therefore, elemental silicon coatings from phosphorous doped targets are less preferred for first surface mirror applications but useable for second surface vehicular mirrors as described below where the substrate provides protection for the thin films from the environment. Elemental silicon coatings from sputtering targets doped with aluminum are less susceptible to such salt spray damage.

Moreover, other dopants such as gallium, boron, arsenic and the like can be used as well. Suitable results have also been obtained using plasma sprayed sputtering targets using either a 200 ppm phosphorous-doped silicon composition or a composition of 6% aluminum and 94% silicon of the type manufactured by Plasmaterials, Inc. of San Ramon, Calif. Plasma spraying is a particularly good process for making sputter targets which have geometries nonamenable to conventional sputter target application and can be more economical in that sputtered regions in a used target can be resprayed and filled in instead of replacing the whole target. Suitable results are also obtained using targets formed from a phosphorous doped, crystalline silicon manufactured by Advance International Materials, Inc. of Suffern, N.Y. using a more conventional sputtering target manufacturing process.

It is desirable that any mirror made in accordance with the present invention have achromatic spectral characteristics if it is to be used as a substitute for currently available, commercially acceptable, chromium coated, spectrally nonselective exterior vehicular rearview mirrors. Achromatism is demonstrated by reflectance which remains relatively constant across most of the visible wavelength region of the light spectrum, i.e., between about 400 and 750 nanometers (nm).

Figure 3:
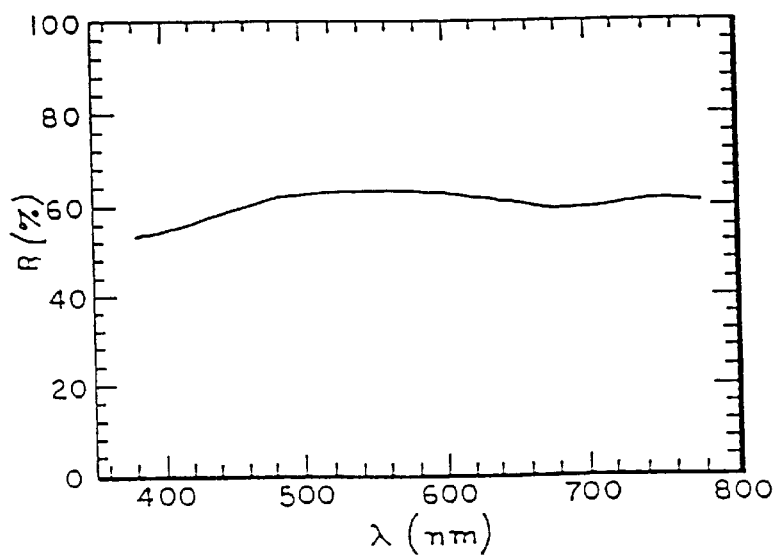
FIG. 3 is a graph of the spectral response for a mirror of the type shown in FIGS. 1 and 2 including a silicon reflective layer of an optical thickness of about 1520 angstroms.

With reference to FIG. 3, the spectral response for a specific rearview mirror like that in FIGS. 1 and 2 made by coating elemental silicon semiconductor to an optical thickness of about 1720 angstroms corresponding to a coating thickness of 380 angstroms at n=4 onto one glass surface is shown. The coating was made with a vacuum sputtering target of 6% aluminum/94% silicon composition sputtered at a pressure of 3 mTorr in a chamber containing neon gas by DC planar magnetron sputtering. Thereafter, the coated glass was bent using a conventional heating and bending process to a radius of curvature of about 40 inches. Bending is conventionally done by heating the glass to at least 450° C. for a period of time sufficient to permit conforming the glass to a mold as is known to those skilled in the art of glass bending. Typically, soda-lime glass of a thickness of about 0.093 inches which is preferably used for the embodiments of the present invention described herein is between several minutes and an hour at a temperature of at least 450° C. in an oven or furnace to permit bending. As shown in FIG. 3, the reflectance differs by no more than about 11% across the entire visible wavelength range as measured. In appearance, the mirror is silvery in color, i.e., spectrally nonselective and achromatic. Its luminous reflectance is 63.2% measured from the front or first surface side, and is 57.4% as measured from the rear or second surface side. The luminous transmittance is 24% measured from either side. Of course, thicker or thinner coatings can be made to have lower reflectance which also fulfill the object of the present invention.

The elemental semiconductor mirrors of the present invention are more scratch resistant than conventional first surface mirrors, whether or not the mirror of the present invention is heated. This is shown by rubbing each with fine steel wool. A first surface achromatic mirror of the present invention that was heated and bent to form a convex mirror was rubbed 4000 strokes with fine steel wool and showed no visible damage on close visual inspection. A chromium coated glass first surface mirror subjected to the same test but for only 1000 strokes showed significant damage that was easily visible. This consumer appreciable benefit of enhanced scratch and wear resistance of the present invention also permits using first surface constructions where second surface constructions may have been selected. A further benefit is then realized in that using first surface rearview mirrors avoids a common undesirable trait of second surface mirrors, i.e. double imaging (reflections from both the front glass surface and the rear mirror coated surface simultaneously). Further, first surface use of the elemental semiconductor of this invention, besides enabling enhanced scratch and wear resistance vis-a-vis metal films, as conventionally used, also benefit from consumer desirable wetting characteristics such that rain drops and the like tend to bead on the elemental semiconductor coated surfaces. On a second surface mirror, raindrops tend to wet and spread out over the glass front surface due to surface energy effects and the like. This can lead to blurred image with increased glare, reduced rear vision and increased eye strain therefrom. By contrast, the beading of water droplets upon an elemental semiconductor coated front surface reduces these effects and the water beads tend to run off the coated front surface of the mirror surface by wind action and the like. Thus, these elemental semiconductors are useful as first surface, reduced wetting mirror reflectors of enhanced scratch and wear resistance compared to conventionally known first surface reflectors such as chromium and the like.

Adhesion of a coating to the substrate or of a coating to an already deposited coating can be enhanced if desired by suitable changes to the vacuum parameters. For example, during deposition, the oxygen partial pressure in the coating chamber can be temporarily increased during formation of the first several monolayers adjacent the substrate surface. This assists in improving adhesion. Similarly, the same can be done during formation of other layers as well with similar results.

In mirror 10, and that of FIG. 3, the elemental silicon layer has an index of refraction (n) equal to or greater than 3. In fact, some report refractive indexes for elemental silicon exceeding 4 in the visible spectrum. The use of silicon with such an index of refraction provides an optical thickness, defined as the product of the layer thickness and the refractive index, which reduces the cost of the present inventive mirror. For example, a thin film having a coating thickness of 1000 angstroms and a refractive index of 3 has an optical thickness of 3 times 1000 angstroms or 3000 angstroms. Thus, with a high index of refraction as with elemental silicon semiconductor, thinner physical layer thicknesses can be used making the mirror less costly to produce.

Optical thickness is an important measurement employed to characterize interference effects which determine the spectral response, i.e., mirror reflectance. Since the present invention uses optical interference, optical thickness is an important consideration in the present mirrors. The optical thickness of a coating can vary across the visible wavelength region of the light spectrum because the refractive index may differ from wavelength to wavelength of light. This phenomenon is known as dispersion. For amorphous elemental silicon in the visible wavelength region, the refractive index varies from $n=4.38$ at a wavelength of 413 nm to $n=3.93$ at a wavelength of 775 nm. Therefore, a typical refractive index of $n=4$ may be assumed to be representative of the refractive index of the deposited elemental silicon in the present invention. The optical thickness based on such a representative index of refraction will be four times the physical thickness. The exact optical thickness depends on the wavelength of light employed for the measurement via the refractive index at that wavelength. Moreover, the refractive indexes listed above are for films deposited under certain conditions. Since the refractive index depends on the deposition conditions, it is preferred to set some limits on the refractive index rather than taking the refractive index to be a specific value for all wavelengths. In general, the refractive index of elemental semiconductors is above $n=3.0$ over the visible wavelength region of the optical spectrum. The present invention utilizes this substantially high refractive index of elemental silicon or germanium thin film without requiring any precise or accurately determined specific values of such refractive index.

Figure 4:
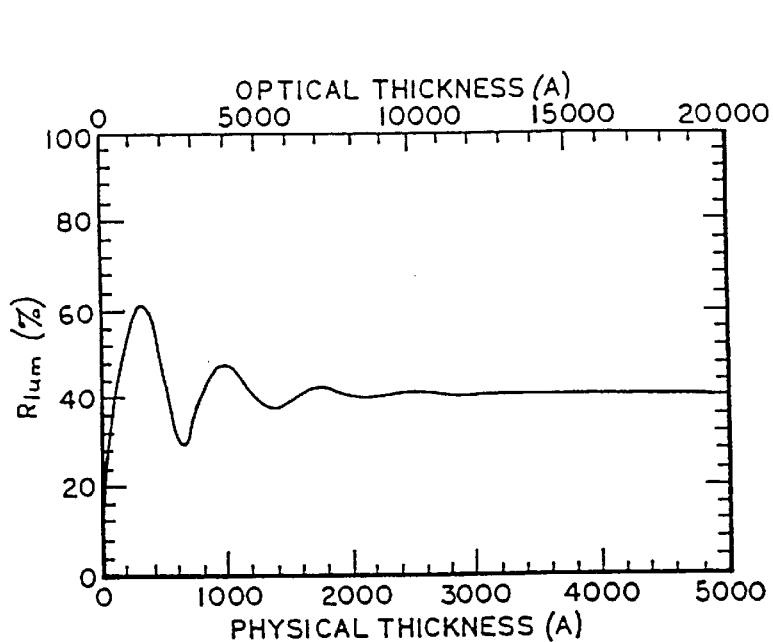
FIG. 4 is a graph of the optical interference effects of varying optical thickness on luminous reflectance for elemental silicon thin films on glass, computed using the dispersion of the refractive index.

FIG. 4 illustrates the effects of optical thickness on the luminous reflectance observed for elemental silicon films on glass, computed using the dispersion of refractive index from which the above refractive indexes were obtained. The bottom axis gives the physical coating thickness and the top axis gives the optical thickness when one assumes that the refractive index is $n=4$ over the region where luminous reflectance is being measured. The oscillations in the curve from 0 to about 2500 angstroms coating thickness, or between 0 and 10,000 angstroms optical thickness, result from optical interference. The high reflectances above 60% occur for coating thicknesses of near 400 angstroms. The interference pattern damps out with greater thickness. This latter effect is due to a dispersive phenomenon called absorption. Whereas dielectric materials typically remain substantially transparent over many thousands of angstroms thickness, and metals typically become opaque or near opaque within about 2000 angstroms optical thickness, elemental silicon goes from highly transmissive at near zero thickness to nearly opaque at about 10,000 angstroms optical thickness. At this point, reflectance becomes constant and does notivary with heavier coating thicknesses. This condition is referred to as near opacity in later embodiments of the present invention.

FIG. 4 also shows that optically opaque or nearly opaque coatings of elemental silicon will have about 40% reflectance, which meets the requirements for luminous reflectance of vehicular rearview mirrors, but will have a grayish cast in reflectance. Thinner layers used in many embodiments of the present invention have a distinctively silvery appearance. When thicker elemental silicon layers are used for opacification or near opacification in the present invention, the silvery color is maintained by using silicon dioxide or other thin film dielectric materials in conjunction with the thick silicon layer behind the mirror coatings.

Also, applying elemental silicon to coating thicknesses beyond those where oscillations cease as shown in FIG. 4 is not a particular benefit in the present invention. Indeed, the use of thicker than required elemental silicon coatings may potentially increase the likelihood of the film cracking, crazing or otherwise being damaged during heating or bending operations as described hereinafter.

Alternately, the mirror embodiment of FIGS. 1–3 can be produced with an elemental germanium semiconductor layer. Elemental germanium thin films require different thicknesses than those used for elemental silicon layers for equivalent performance because the index of refraction (n) of germanium is higher than that of silicon, i.e., about 5 and ranging from values of about 4.5 to 5.5 in various visible wavelength regions. A value of n=5 is used for illustrative purposes herein and to provide a simple conversion between layer thickness and optical thickness. For example, germanium layers would preferably require layer thicknesses within the range of 160 to 500 angstroms to produce an optical thickness of between about 800 and 2500 angstroms which is generally equivalent to that of a silicon layer thickness within the range of about 200 to 600 angstroms producing an optical thickness of between about 800 and 2400 angstroms.

Layers of silicon or germanium differ in their preferred thicknesses for meeting the objects of the present invention as their dispersions of refractive index differ. Achieving a luminous reflectance of about 30% requires an optical thickness of about 345 angstroms of silicon whereas 275 angstroms is sufficient for germanium. Likewise, a luminous reflectance of about 35% requires an optical thickness of about 400 angstroms of silicon whereas 325 angstroms is sufficient for germanium. Similarly, differences in optical thickness between silicon and germanium elemental semiconductor layers are required when other levels of reflectance are desirable. In particular, for germanium elemental semiconductor layers, the corresponding preferred range of optical thickness is from about 275 angstroms to about 2500 angstroms.

Light absorbing coating 22 on the rear surface 16 of mirror 10 may be any dark colored, preferably black, or other light absorbing paint or lacquer applied by spraying, roller coating or curtain coating. Light absorbing coating 22 will have a thickness dependent on the type of coating selected. This thickness will be sufficient to provide an overall luminous transmittance of about 4% or less, and will typically be in the range of 10 microns to 1 mm. For example, a suitable protective paint is METAL SAVER™ black epoxy coating spray paint #7886, Rust Oleum Corp., Vernon Hills, Ill. When applied to the rear surface of the mirror substrate 12, layer 22 absorbs most or all of the light transmitted through the semiconductor coating 20. Alternately, pigmented adhesive, adhesive tape, UV curable pigmented adhesive having a dark, black or other color followed by a black colored or other highly absorbing tape or other backing such as ceramic may be applied to the rear surface of the mirror to absorb light in the same fashion. Application of a dark colored or black opaque tape or some black or dark colored hot melt plastic or a dark colored, UV, thermally or catalytically cured epoxy material to the rear surface of the invention to a thickness sufficient to keep luminous transmittance of the mirror to less than about 4% but up to a few millimeters total thickness can provide not only the desired light absorption, but also scatter proofing safety. Tapes, plastic coatings or other adhesive systems hold pieces of the glass mirror substrate together in the event of breakage due to impact or other forces. Such scatter prevention prevents injury to vehicle passengers by preventing the scattering of fragments or shards of glass from the mirror.

It is also possible to incorporate certain dark or black paints which survive high temperatures and yet still function to absorb light transmitted through the reflective elemental semiconductor coating 20. Examples of such paints, which may be applied to the flat glass substrate 12 and subsequently heated and bent along with the semiconductor coating 20 are HIGH TEMP GUARD™ black paint manufactured by Advance Materials of Peachtree City, Ga. and DENPLEX™ #21202 black high temperature paint manufactured by U.S. Packaging Corporation of Wheeling, Ill.

Figure 5:
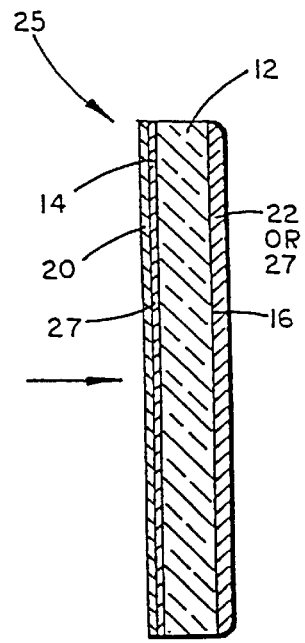
FIG. 5 is a sectional view of a second embodiment of a spectrally nonselective vehicular mirror of the present invention.

As a further alternative, a slightly modified embodiment 25 of the spectrally nonselective, elemental semiconductor coated, glare-reducing mirror 10 of FIGS. 1–3 may be used as shown in FIG. 5. Mirror 25, where like number numerals indicate like parts to those in mirror 10, includes a substrate 12, elemental silicon or germanium semiconductor coating 20 adjacent the front surface 14, and a light absorbing or anti-scatter coating 22 applied as described above to rear surface 16 of the substrate. In this version, however, a dark or black ceramic thin film 27 is applied first to the front surface 14 of substrate 12 over which the elemental silicon semiconductor layer 20 is thereafter applied in the manner described above. Alternately, ceramic thin film layer 27 may be applied to the rear surface 16 of substrate 12 in place of layer 22 to perform the same light absorbing function. Preferably, layer 27 is a titanium/aluminum/oxi-nitride composite layer which is opaque, highly light absorbing, and black at preferred thicknesses of a few tenths of a micron. It will also be apparent that anti-scatter layer 22 may be coated over ceramic layer 27 when applied to rear surface 16 to provide anti-scatter protection not provided by the ceramic layer. In such case, the optical properties of layer 22 are not important.

Alternately, when elemental silicon semiconductor layer 20 is applied to first surface 14 of substrate 12, light absorbing layer 22 may be omitted if substrate 12 is formed from an opaque ceramic or light absorbing glass material which itself will absorb light and reduce secondary reflections thereby obviating the need for any additional light absorbing layer. For example, a sheet of black ceramic tile may be used as substrate 12 to obtain desired performance characteristics for the mirror shown in FIGS. 1–4.

Figure 6:
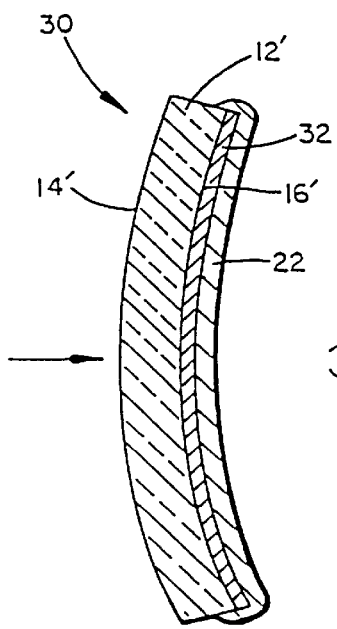
FIG. 6 is a sectional view of a third embodiment of a spectrally nonselective, convex vehicular mirror of the present invention.

A second embodiment 30 of the present invention is provided with a coating on the rear or second surface 16' of curved, soda-lime glass substrate 12' is shown in FIG. 6. As illustrated, mirror 30 is bent to a convex form such that the outer glass viewing surface 14' is convex while the rear surface 16' is concave. A layer 32 of elemental silicon is applied to an optical thickness between about 480 and 2400 angstroms, and preferably between about 550 and 1600 angstroms for a luminous reflectance of between 35% and 65%, corresponding to a coating thickness of about between 137 and 400 angstroms at n=4, by DC sputtering in neon gas on rear surface 16'. A dark colored backing layer 22 of the type described above is then applied over the silicon coating 32. As described below, especially in connection with mirror 80 in FIG. 16, backing coating 22 may be extended around silicon layer 32 for protection against environmental effects although layer 32 is sufficiently durable even without such protection. The silicon was sputtered from a 94% silicon/6% aluminum composition sputtering target.

Figure 7A:
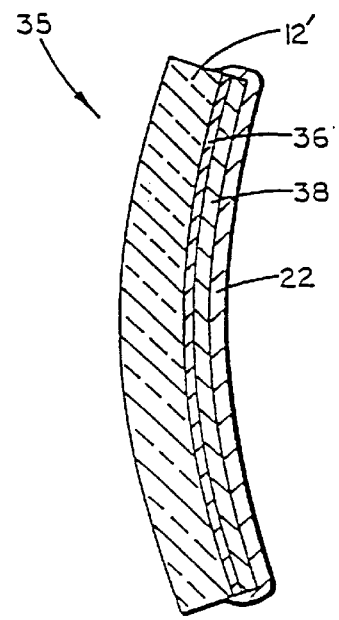
FIG. 7A is a sectional view of a fourth embodiment of a spectrally nonselective, convex vehicular mirror of the present invention.
Figure 7:
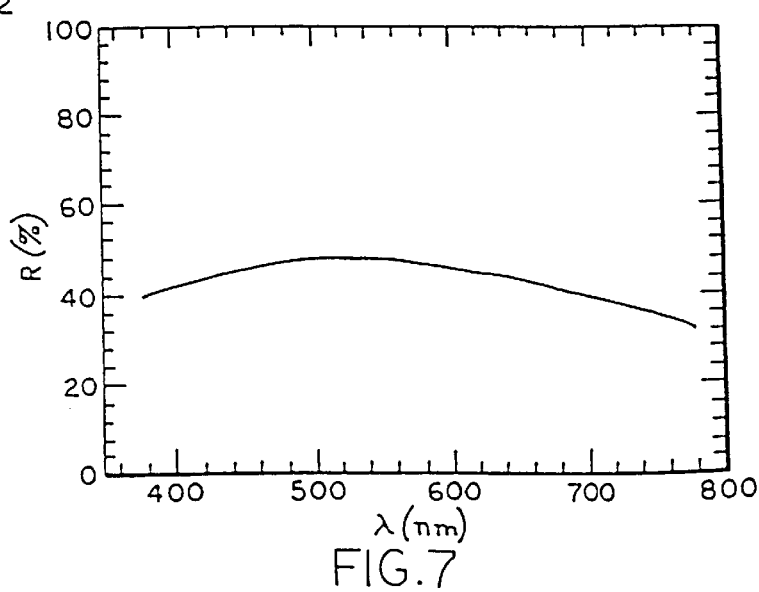
FIG. 7 is a graph of the spectral response for the spectrally nonselective mirror of FIG. 6 including an elemental silicon layer of an optical thickness of about 1600 angstroms.

FIG. 7 illustrates the spectral reflectance in the visible wavelength region for mirror 30 with an elemental silicon layer 32 of an optical thickness of about 1600 angstroms and coating 22 as described above. The luminous reflectance after heating and bending, but before applying dark backing coating 22, is 61.5% as measured from the concave side of the mirror, and 55.9% as measured from the convex or viewing side. The luminous transmission through the glass and layer 32 is 24.6%. After coating the rear surface with Rust Oleum METAL SAVER™ black epoxy coating spray paint #7886, the luminous reflectance as measured from the convex side is 47.5%. As shown in FIG. 7, the reflectance varies by no more than about 16% over the visible spectrum making mirror 30 essentially achromatic or spectrally nonselective.

Mirror 30 differs from mirrors 10 and 25 in that the initial reflecting surface is the glass/silicon interface whereas, in mirrors 10 and 25, it is the air/silicon interface that is first encountered. Less light is reflected in mirror 30 prior to encountering the absorbing effect of the silicon layer 32 itself. The higher reflectance from the first encountered surface in mirrors 10 and 25 compared with the first encountered surface in mirror 30 is due to a larger difference in the refractive indexes at the air/silicon interface than at the glass/silicon interface. Also, dark colored backing 22, if used, impacts the optical response of mirror 30 since it directly contacts one surface of the silicon elemental semiconductor layer 32. The optical constants of the paint/lacquer/resinous plastic, epoxy cured plastisol or like backing have some effect on the optical response, i.e., on reflectance as a function of wavelength, and therefore also on the luminous reflectance of the mirror. Yet, it is possible to achieve luminous reflectances between 55% and 60% by proper selection of the thickness of layer 32 of the silicon elemental semiconductor and by care and selection of the paint or other dark backing layer 22.

It is also possible to include a low refractive index dielectric material such as silicon dioxide or silicon nitride coated over silicon layer 32 followed by an opaque thin film or dark backing such as paint, lacquer, epoxy cured plastisol, resinous plastic or the like in order to provide the desired level of reflectance and the desired spectral nonselectivity or spectral selectivity. For example, a second surface achromatic mirror 35 of this construction was made as shown in FIG. 7A by coating a thin layer 36 of elemental silicon semiconductor onto a glass substrate 12' followed by coating a thin layer 38 of silicon dioxide over the silicon, then bending the coated glass, then painting the coated side of the construction as shown at 22 in the manner described above. The elemental silicon semiconductor layer 36 was coated to an optical thickness of about 750 angstroms, and this was followed by coating a thin layer 38 of silicon dioxide to an optical thickness of about 1600 angstroms. The coated glass substrate was then bent so that the thin layers were on the concave surface of the glass substrate. Finally, a black epoxy spray paint coating 22 of Rust Oleum #7886 METAL SAVER was applied to the rear of the silicon dioxide layer. This design yielded a luminous reflectance of about 52%, viewed second surface through the glass substrate. Moreover, the mirror was still silvery or achromatic in appearance.

Figure 8:
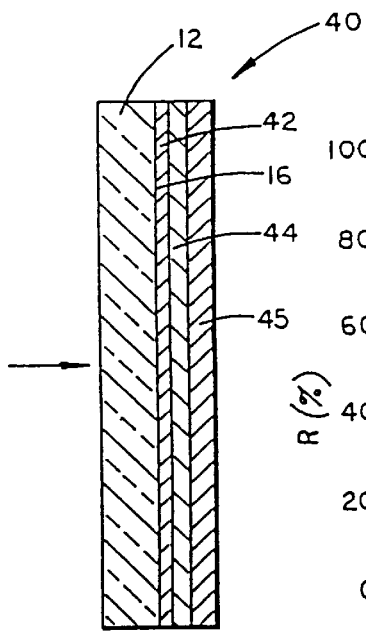
FIG. 8 is a sectional view of a fifth embodiment of a second surface spectrally nonselective mirror of the present invention.
Figure 9:
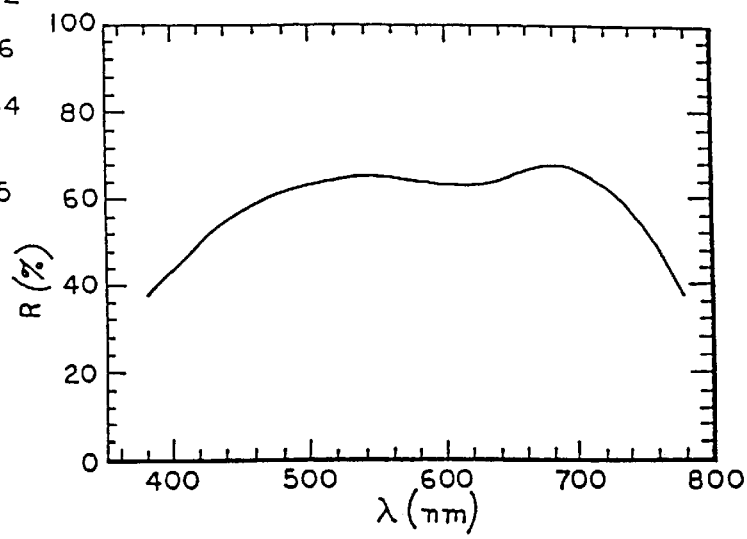
FIG. 9 is a graph of the spectral response for the mirror of FIG. 8 including an elemental silicon layer of an optical thickness of about 800 angstroms, followed by a layer of silicon dioxide of an optical thickness of about 1500 angstroms, followed by a second layer of elemental silicon of an optical thickness of about 7200 angstroms.

With reference to FIGS. 8 and 9, an alternate form 40 of the mirror invention is shown wherein secondary reflections are reduced using thin films. Mirror 40 includes highly absorbing thin films which are adjusted and provided in appropriate thicknesses in place of dark colored backing layers such as that described above at 22 whereby the entire coated substrate essentially is opaque, or near opaque, or low light transmitting in nature, i.e., less than 4% luminous transmission. This alternate form can be included in both first and second surface mirrors of both the achromatic or nonspectrally selective and spectrally selective or blue types of mirrors. If elemental silicon is used as the highly absorbing thin film, then the coating may be heated and bent without sacrificing reflective or other optical qualities as described below. This differs from the use of metals that either will not survive bending or require the use of sacrificial layers to maintain their integrity during high temperature bending processes, or merely to survive heating in an oven. Using elemental or near elemental silicon thus provides significant advantages over use of metals.

The use of thin films for opacifying mirrors of the present invention as described above can be preferred in order to avoid secondary operations of applying absorbing coatings or tapes to the mirror rear surface. For example, painting can overspray or wick onto the mirror front surface, requiring another face scrubbing or cleaning operation to remove the undesirable overspray. Avoiding overspray or wicking requires extra fixturing and/or care. Also, painted parts are more difficult to cut into shapes. We find locating the cutting wheel scribe line more difficult on painted mirrors than on mirrors opacified by the use of thin film means, resulting in yield loss from errors in breaking the cut shape out of the larger glass lite. Therefore, there are certain advantages that come from opacification or near opacification by the use of thin film means. Even more advantage is gained because the entire opacified or near opacified mirror of the present invention is bendable, thus permitting single shape bending after cutting the shape from a flat lite of glass. A further advantage of opacification or near opacification by use of thin film means is that the entire commercially useable mirror comprising the reflective means and the opacification or near opacification means can be fabricated in an integrated process, such as a thin film deposition chamber, without requiring subsequent processing.

As shown in FIG. 8, a specific achromatic, nonspectrally selective mirror design 40 is illustrated including a two layer combination of silicon dioxide or silicon nitride and elemental silicon substituted for the dark colored backing layer. In this case, the first elemental silicon layer on glass is adjusted to produce an achromatic second surface mirror. As shown in FIG. 8, a layer of elemental silicon 42 having an optical thickness of about 800 angstroms, corresponding to a coating thickness of about 200 angstroms at n=4, is sputtered as described above onto rear surface 16 of a flat, soda-lime glass substrate 12. Thereafter, a silicon dioxide layer 44 having an optical thickness of about 1500 angstroms, corresponding to a coating thickness of about 1000 angstroms at n-1.5, is applied by RF sputtering using a silicon dioxide target in argon sputtering gas at a pressure of 3 mTorr as described above. Subsequently, a thicker layer 45 of elemental silicon is deposited in the same manner as the first elemental silicon layer 42 but having an optical thickness of about 7200 angstroms corresponding to a coating thickness of about 1800 angstroms at n=4. In this form, thicker layers 45 of elemental silicon are acceptable. The selection of layer thicknesses to provide opacification is made such that the overall luminous transmittance is below about 10% and preferably below about 4% for any mirror of the present invention. For example, elemental silicon layers 45 of optical thickness greater than about 4000 angstroms or thereabouts achieve overall luminous light transmittance of about 10% or less. Use of elemental silicon layers 45 of optical thickness greater than about 6800 angstroms will achieve overall luminous light transmittance of about 4% or less. When manufactured with layer 45 being silicon of optical thickness 7200 angstroms, mirror 40 has a luminous reflectance of 61% and a luminous transmittance of 0.1%. When heated to over 500° C. in less than a minute by placing into a furnace, the resulting heated coating maintains a reflectance of at least 61%, is achromatic or spectrally nonselective, and has a luminous transmittance of only 0.8%. This result is illustrated in FIG. 9 wherein the second surface spectral reflectance is shown as a function of wavelength of incident light. Even though mirror 40 has no dark colored or black backing at all, it still is silvery in color when viewed from the front side.

As indicated previously, thin film opacification means can be used for both the first and second surface mirrors of both the achromatic and spectrally selective type. For example, an opacified achromatic first surface mirror can be constructed by using a thin film design comprising an outer reflector layer of silicon elemental semiconductor, of optical thickness 800 angstroms or thereabouts, which is opacified with an underlying additional thin film means consisting of a thin film of silicon dioxide, of optical thickness 428 angstroms or thereabouts, followed by a thin film of silicon elemental semiconductor, of optical thickness of at least 4000 angstroms or thereabouts and preferably of at least 6800 angstroms or thereabouts, all deposited onto the front surface of the glass substrate. The optical design is thus air/silicon (800 angstroms optical thickness)/silicon dioxide (428 angstroms optical thickness)/silicon (6800 angstroms optical thickness)/glass and is similar to that in FIG. 9A. Further, for either first or second surface mirrors, the additional thin film means are disposed to the rear of the elemental semiconductor reflector layer. Such opacified first surface mirrors have commercial advantage in that the reflector layer and additional thin film opacification means are deposited on the same glass surface, thus facilitating coating deposition onto glass substrates being conveyed past a sputtering target, for example, and in that a single type of sputtering target, for example, a silicon target in the designs above, can be used to deposit all the layers in the thin film construction.

Figure 9A:
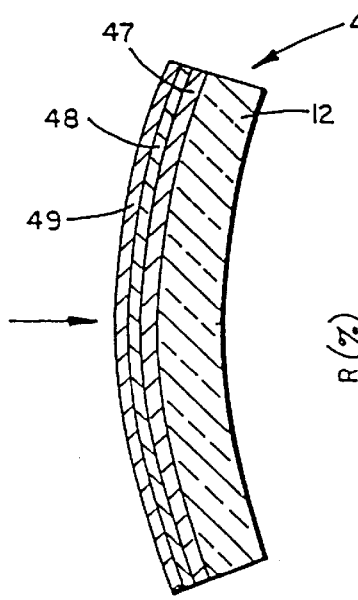
FIG. 9A is a sectional view of a sixth embodiment of the invention comprising an achromatic, spectrally nonselective, first surface, convex vehicular mirror.
Figure 9B:
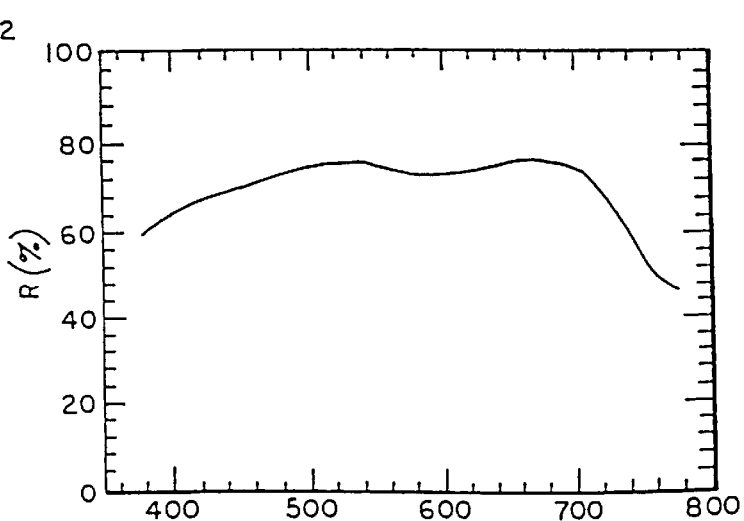
FIG. 9B is a graph of the spectral response for the achromatic mirror of FIG. 9A including a coating of elemental silicon on glass of about 6950 angstroms, a thin film of silicon dioxide of about 1050 angstroms, and a second thin film of elemental silicon of about 1600 angstroms as the outermost layer.

Within the context of this invention, full or high reflectivity is a mirror reflectance that approaches as close as is practical the 90% or thereabouts luminous reflectance conventionally provided by second-surface silvered mirrors. Car drivers, particularly in the United States, have for decades opted to use exterior glare-reducing rearview mirrors which use a thin film of chromium metal as their reflector element and thereby achieve a reflectance level (of 55±5% or thereabouts) which is moderate and offers a compromise between daytime visibility and nighttime glare protection. However, truck drivers in general, and some car drivers, particularly in Europe, have continued use of silvered, high reflectance mirrors. They do so because they particularly value the extra rear vision performance of such high reflectance mirrors and are willing to suffer the excessive glare reflected off said high reflectance mirrors. Thus, some drivers desire a high reflectance mirror with at least 60% luminous reflectance desirable, and greater than 70% preferred. To meet these driver's preferences, another embodiment 46 of an opacified achromatic mirror was made as shown in FIG. 9A comprising a first surface mirror having a first layer 47 of elemental silicon coated onto a glass substrate 12 to an optical thickness of about 6950 angstroms, followed by deposition of a thin film 48 of silicon dioxide at an optical thickness of 1050 angstroms, followed by deposition of a thin film 49 of elemental silicon to an optical thickness of about 1600 angstroms. Mirror 46 had a luminous reflectance of 69% before heating and bending and, as shown in FIG. 9B, a luminous reflectance of 74% after heating and bending. This convex, curved mirror then offers those drivers who desire to use a high reflectance mirror the advantages of scratch and wear resistance offered by the elemental semiconductor mirror.

Figure 10:
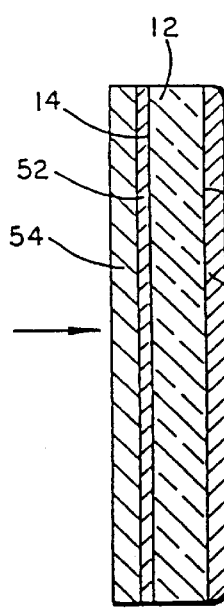
FIG. 10 is a sectional view of a seventh embodiment of a spectrally selective vehicular mirror of the present invention.

A seventh embodiment 50 of the mirror incorporating an elemental semiconductor layer is shown in FIG. 10. Mirror 50, where like numerals indicate like parts, is a spectrally selective, glare-reducing mirror in which the spectrally selective color, namely, blue, being reflected is strong and quite noticeable to the viewer. In mirror 50, substrate 12 includes a first layer 52 of elemental silicon semiconductor preferably vacuum sputter coated on first surface 14 to an optical thickness of between about 345 and 2400 angstroms, and preferably between about 720 and 920 angstroms corresponding to a coating thickness of between about 180 and 230 angstroms at n=4. If elemental germanium is used, layer 52 will have an optical thickness of at least about 275 angstroms. Applied over the front surface of silicon layer 52 is a relatively thicker, interference layer 54 of a dielectric material, namely, silicon dioxide (also known as silica) having an optical thickness of at least about 500 angstroms, and preferably of between about 1600 and 2800 angstroms, and most preferably of about 2250 angstroms corresponding to a coating thickness of about 1500 angstroms and an index of refraction of about n=1.5. Finally, a light absorbing coating 22 is applied as described above to rear surface 16 of the substrate.

Preferably, silicon dioxide coating 54 is applied in a vacuum sputter coating chamber in a manner similar to that for silicon layer 20 as described above for mirror 10. In addition, silicon dioxide layer 54 can be applied in the same vacuum sputter coating chamber as silicon layer 52 if there is sufficient separation of the coating compartments to eliminate any oxygen liberated or employed purposely for the silicon dioxide coating process being involved in the relatively oxygen free environment present in the coating chamber wherein silicon semiconductor deposition occurs. Preferably, silicon dioxide layer 54 is formed by radio frequency (RF) or direct current (DC) reactive sputtering using a silicon elemental semiconductor target within a sputtering chamber including an atmosphere of an inert gas mixture such as neon, argon or the like and oxygen. Alternately, the atmosphere may be pure oxygen. The sputtering in such chamber creates an oxidized layer of the semiconductor target material. Alternately, silicon dioxide may be radio frequency sputtered from a fused quartz or silicon dioxide ($SiO_2$) target in an atmosphere of argon, neon, oxygen, or mixtures thereof or other gas used as a sputter discharge support gas. RF sputtering is particularly useful if the silicon elemental semiconductor target is not very electrically conductive or if silicon dioxide, which is an electrical insulator, is used. If, however, the silicon elemental semiconductor target is doped with phosphorous as mentioned above, then the conductivity may be sufficient for use of DC sputtering.

Examples of other thin film dielectric materials suitable for our mirror applications are fluorides, of which cryolite and magnesium fluoride are exemplary, other oxides such as silicon monoxide, cerium oxide, tantalum oxide, titanium dioxide, and aluminum oxide, sulfides like zinc sulfide and nitrides such as silicon nitride. Such dielectrics can be deposited by vacuum deposition or other techniques such as dip coating, to produce thin film layers of refractive index between about 1.3 and 2.7.

Figure 11:
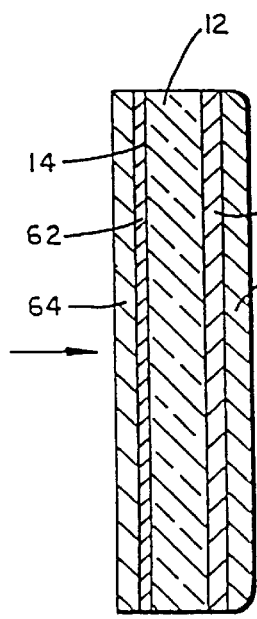
FIG. 11 is a sectional view of a eighth embodiment of a spectrally selective vehicular mirror of the present invention.

As an alternative to the spectrally selective mirror 50 shown in FIG. 10, a similar spectrally selective mirror 60 is shown in FIG. 11 where like parts are indicated by like numerals. Mirror 60 includes a transparent glass substrate 12 having a thin layer of elemental silicon semiconductor 62 on front surface 14. Layer 62 is applied preferably by vacuum sputtering as described above or alternately by other vacuum deposition methods. Next, a silicon dioxide layer 64 is dip-coated or spin coated on at least the coated surface of substrate 12. In some cases, similar thin film layer 66 may be simultaneously dip-coated on rear surface 16. Alternately, rear surface 16 may be covered to prevent coating when dipped. When substrate 12 is soda-lime glass, the silicon dioxide or silica layers 64, 66 have a refractive index close to as that of the glass. Hence, little or no reflection occurs at the silica/glass interface so that dip-coated silicon dioxide layer 66 is coated on rear surface 16 of silicon coated glass with no appreciable effect on the optics. Yet, layer 64 which overcoats the silicon 62 on the front side of the substrate, has an appreciable interference optical effect creating the spectral selectivity desired for the mirror. After the above dip coating of layers 66 and/or 64, a light absorbing layer 22 can be applied to the rearmost surface over dip-coated silica layer 66 or rear surface 16 in the manner described above or, alternately, can be omitted if substrate 12 is an opaque glass or ceramic or other substrate.

The above dip coating method for applying layers 64, 66 of silicon dioxide may be accomplished by the dip and fire technique wherein substrate 12 including coating 62 thereon is dipped into a solution of an appropriate precursor of silicon dioxide dissolved in a suitable solvent. For example, a solution formed by dissolving tetraethylorthosilicate in alcohols can be used. Upon withdrawal from this solution, the solution evenly wets one or both surfaces, i.e., the coated first surface and the uncoated second surface, of the substrate depending on whether the second surface is covered when dipped. The coating on the first and second surfaces is then fired in an oven at about 450° C. for about 60 minutes, or thereabouts, to complete hydrolysis and condensation and to densify the newly formed oxide coating. If curved glass is desired, either the dipped coating or the dip/fire oxide coating can be bent in a conventional bending process. The thicknesses of the dip-coated silicon dioxide films can be adjusted by modifying the withdrawal rate from the oxide precursor solution. The faster the withdrawal rate, the thicker the film on the coated and uncoated substrate sides.

Figure 12:
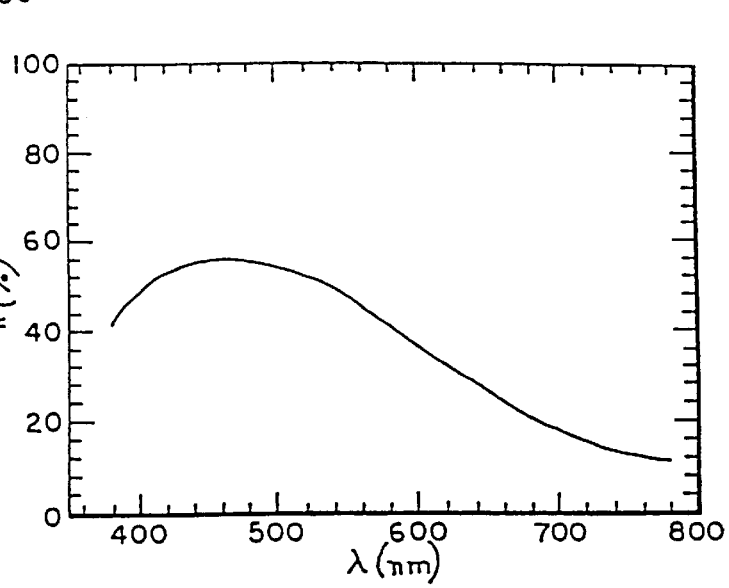
FIG. 12 is a graph of the spectral response for a spectrally selective mirror similar to that shown in FIG. 10 including a multilayer coating of an optical thickness of about 2160 angstroms silicon dioxide sputter coated atop a layer of silicon of an optical thickness of about 880 angstroms on glass.

As an example of mirrors 50 and 60 shown in FIGS. 10 and 11, the spectral reflectance for a similar mirror in the visible region is shown in FIG. 12. A 680 angstrom optical thickness layer of elemental silicon semiconductor, corresponding to a coating thickness of about 170 angstroms at n=4 was deposited on the front surface of a glass substrate by DC sputtering from a sputtering target comprising a composition of 6% aluminum and 94% silicon using neon sputtering gas at a pressure of 3 mTorr. Thereafter, a 2160 angstrom optical thickness layer of silicon dioxide dielectric corresponding to a coating thickness of about 1440 angstroms at n=1.5, was deposited as an interference coating by radio frequency sputtering from a silicon dioxide sputtering target using argon sputtering gas at a pressure of 3 mTorr at an RF power of 2 kW. This coated glass was then bent in a conventional glass bending apparatus by heating to at least 450° C. for between a few minutes and an hour followed by pressing the heated, coated glass in a curved mold. At this point, the luminous transmittance was 38.9% and the luminous first surface reflectance was 42.7%. The rear or second surface was then coated with a BLACK BASE COAT paint manufactured by Lilly Industrial Coatings of Indianapolis, Ind. The resultant mirror had a luminous reflectance of 42.1% which is only slightly lower than before applying the paint and is suitable for use as an exterior automotive rearview mirror world wide. The thicknesses of both the silicon and silicon dioxide layers provide such reflectance and can be adjusted to change the luminous reflectance. For example, if the optical thickness of silicon elemental semiconductor layer 52 or 62 is decreased to below about 680 angstroms but remains above 345 angstroms, corresponding to a coating thickness of 170 angstroms and 86 angstroms, respectively, at n=4, while the silicon dioxide layer remains at an optical thickness of about 2250 angstroms corresponding to a coating thickness of about 1500 angstroms, the luminous reflectance will decrease below 40% as the elemental silicon layer gets thinner.

Figure 13:
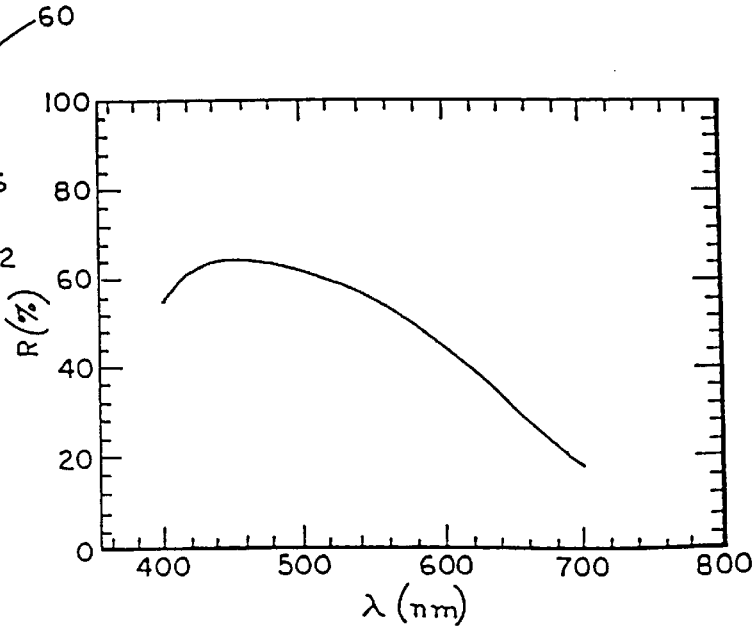
FIG. 13 is a graph of the spectral response for a prior known, commercially available, spectrally selective mirror sold by Donnelly Corporation of Holland, Mich., U.S.A.

For comparison purposes, the luminous reflectance of a commercially available spectrally selective blue mirror marketed by Donnelly Corporation of Holland, Mich. under the name "BLUE MIRROR" using a multilayer coating having a nearly opaque metal therein is shown in FIG. 13. The peak reflectance occurs in both mirrors between 400 and 500 nm in the blue range of the visible spectrum and falls off sharply thereafter in the yellow/red portions of the spectrum. As indicated, the response is sufficient for the mirror similar to that of mirrors 50 and 60 to provide acceptable spectral response with an already commercially accepted rearview mirror.

Another rearview mirror 70 incorporating the present invention and comprising a first surface spectrally selective mirror is shown in FIG. 14 where like numerals indicate like parts in mirrors 10, 25, 30, 35, 40, 50 and 60. Mirror 70 includes a transparent or opaque substrate 12, preferably formed from soda-lime glass or ceramic, a thin layer of elemental silicon semiconductor 72 on first or front surface 14, and a second layer 74 of another dielectric material, namely, silicon nitride coated on the front surface of silicon layer 72. A light absorbing layer 22 of the type described above is applied by one of the above-described methods to rear surface 16 to prevent secondary reflections as mentioned above. Silicon layer 72 preferably has an optical thickness of between about 800 to 1200 (coating thickness of 200 to 300 angstroms at n=4) angstroms, while silicon nitride layer 74 has a preferred optical thickness of 1600 to 2800 angstroms (coating thickness of 800 to 1300 angstroms at n=2.0). Silicon nitride is a useful interference coating to provide the spectral selectivity desired for the mirror since its index of refraction (n) is about 2.0 to 2.2. As with layers 54, 64 in mirrors 50, 60, it is desired that the interference coating have an optical thickness equal to approximately one-quarter of the wavelength of the region of the visible spectrum to be suppressed or spectrally selected in the mirror.

The spectral reflectance of a mirror made in accordance with mirror 70 is shown in FIG. 15 calculated for a soda-lime glass substrate coated with an optical thickness of about 1200 angstroms of silicon elemental semiconductor as layer 72 (coating thickness of about 300 angstroms at n=4) followed by layer 74 of silicon nitride having an optical thickness of about 2000 angstroms (coating thickness of about 1000 angstroms at n=2.0) and an n=2.0 to 2.2 over the silicon layer 72. The luminous reflectance is computed to be 40.3% and, thus, is useful as an exterior rearview mirror in both the United States and Europe. Excellent spectral selectivity is obtained due to the high reflectance in the 400 to 500 nm region or blue wavelength portion of the visible spectrum and the low reflectance in the yellow/red portion of the spectrum above about 560 nm wavelengths.

In FIG. 16, another mirror 80 is shown comprising a spectrally selective blue mirror in which multiple thin coatings are formed on the second surface 16 of the transparent glass substrate 12. Mirror 80 includes a thin layer 82 of silicon nitride coated to an optical thickness of between about 1600 and 2800 angstroms corresponding to a coating thickness between about 800 and 1,400 angstroms when n=2.0, and preferably an optical thickness of 2200 angstroms on rear surface 16 of substrate 12, followed by layer 84 of elemental silicon semiconductor having an optical thickness between about 275 and 2400 angstroms corresponding to a coating thickness between about 68 and 600 angstroms at n=4, and preferably, an optical thickness of between about 500 and 1200 angstroms. This is followed by another layer 86 of silicon nitride coated to an optical thickness of about 2400 angstroms corresponding to a coating thickness of about 1200 angstroms at n=2.0. Again, as in previous embodiments, a light absorbing layer 22 is coated over the rear surface of the final silicon nitride layer 86 to reduce secondary reflections and improve mirror performance. Light absorbing layer 22 can be formed from any of the materials or coatings set forth above in connection with mirror 10 or the other embodiments. As shown in FIG. 17, the spectral reflectance for mirror 80 with layers 82, 84, 86 having optical thicknesses of 2200, 1200 and 2400 angstroms, respectively, provides enhanced spectral reflectivity in the blue region of the visible spectrum between 400 and 500 nm while the overall luminous reflectance of the entire mirror is about 38%. Reflectance in the yellow/red wavelength region above about 560 nm is significantly reduced showing the usefulness of mirror 80 as a glare-reducing, spectrally selective, blue mirror.

Although light absorbing coating 22 is shown as being only on the rear surface of thin silicon nitride layer 86, it can be extended around the edges of layer 82, 84 and 86 to overlap the peripheral edge of substrate 12 as shown in the dotted lines of FIG. 16. This helps to protect the edges of the thin layer coatings from elemental conditions such as moisture, humidity, salt spray, car wash detergents, oxidation, abrasion and the like commonly encountered by vehicles. However, it has also been found that the elemental semiconductor layers of silicon or germanium in the present invention have excellent inherent resistance to damage from such environmental effects even without protective overcoatings of this type. Indeed, a coating of silicon or germanium on the first surface of a substrate as described above has significant resistance to environmental damage due to oxidation, salt, heat, humidity, abrasion, detergents and the like. As described below, the scratch resistance and hardness of single semiconductor layers especially of silicon can be improved by heating the coated substrate such as in a lehr heating conveyor line.

Figures 18, 19:
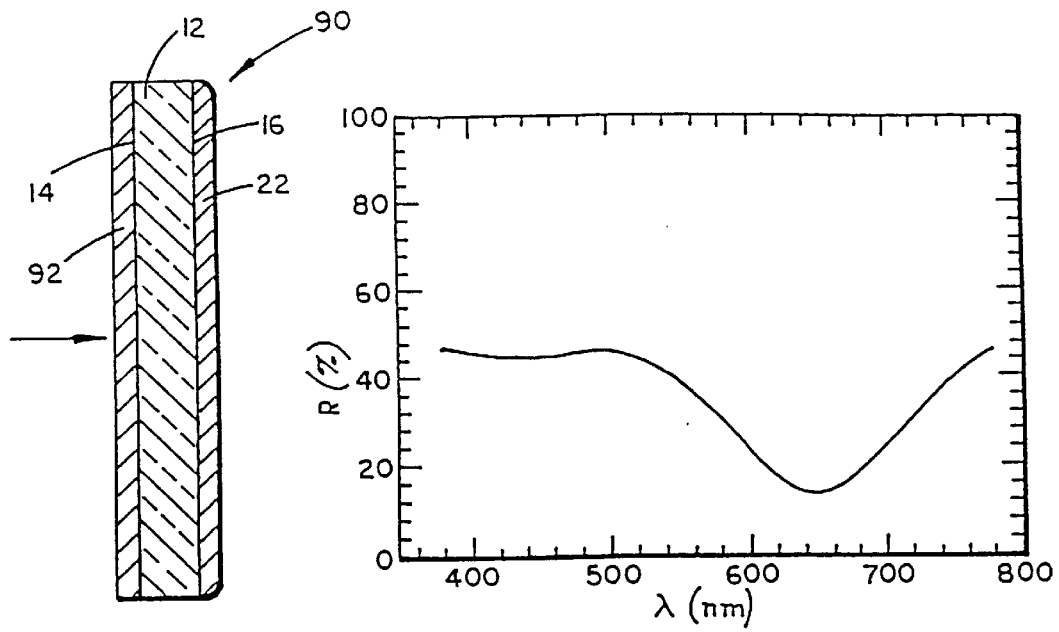
FIG. 18 is a sectional view of a eleventh embodiment of a spectrally selective vehicular mirror of the present invention.
FIG. 19 is a graph of the spectral response of the mirror of FIG. 18 including a single layer of silicon having an optical thickness of about 4800 angstroms on glass.

As shown in FIGS. 18 and 19, the present invention also encompasses spectrally selective rearview mirrors constructed of single layers of an elemental semiconductor preferably coated to an optical thickness of within the range of between about 2400 and 10,000 angstroms depending on whether silicon or germanium is used. For example, as shown in FIG. 18, mirror 90 includes a single layer 92 of elemental silicon semiconductor coated to an optical thickness of about 4800 angstroms corresponding to a coating thickness of about 1200 angstroms at n=4 on the first surface 14 of glass substrate 12. In addition, a light absorbing layer 22 such as that described above for the other rearview mirror embodiments may be coated on rear surface 16 to reduce secondary reflections. Mirror 90, when constructed in this form, provides a spectral reflectance which is visually blue and an overall luminous reflectance of about 31% as shown in FIG. 19. FIG. 19 also illustrates the enhanced reflectance in the blue region of the visible spectrum, namely, in the 400 to 500 nm region.

Figure 20:
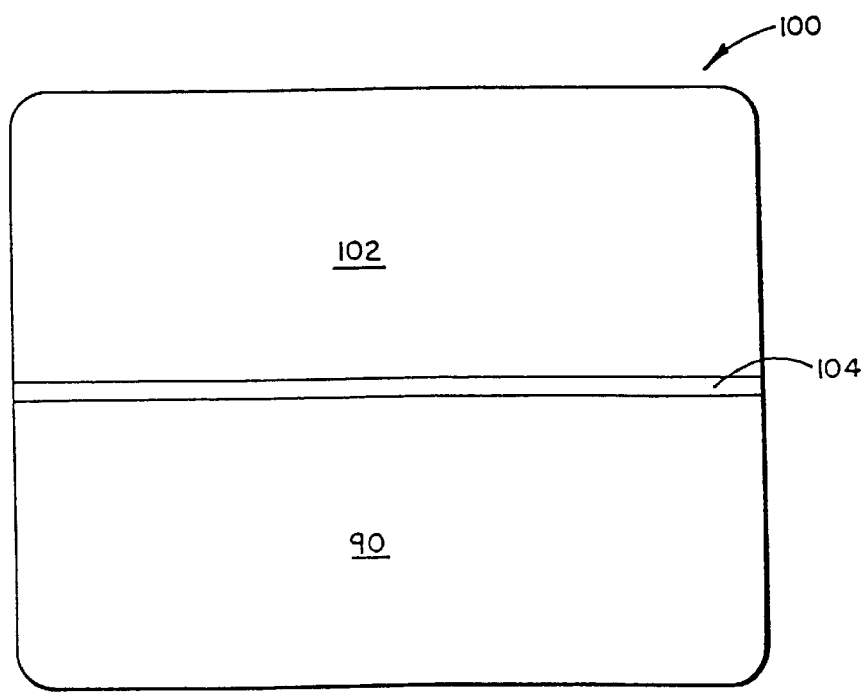
FIG. 20 is a front view of a combined vehicular mirror including a lower panel comprising the mirror of FIG. 18 and a second, upper panel having a higher luminous reflectance than that of the lower panel.

Although luminous reflectance for mirror 90 shown in FIGS. 18 and 19 is below the 35% required for U.S. and European automotive rearview mirror applications, such mirror may be combined to produce an overall mirror 100 (FIG. 20) including a high luminous reflectivity mirror panel 102 positioned in a suitable frame or case 104 vertically above the reduced luminous reflectivity, glare-reducing mirror panel 90. Mirror 100 will provide extra glare-reducing protection in high glare environments but permit a driver to observe using the higher reflectance mirror 102 when desired. Alternately, such a mirror can be used in countries outside the U.S. or Europe where regulations are different, or in applications where such regulations do not apply.

It is also possible to modify the visual color enhanced in the spectrally selective mirror such as that shown in FIGS. 18 and 19 by varying the thickness of the single layer 92 of mirror 90. For example, by coating layer 92 to an optical thickness of about 9600 angstroms, corresponding to a coating thickness of about 2400 angstroms at n=4, a mirror enhancing visibility in the blue-green region of the visible spectrum from about 400 nm to 600 nm is produced.

Figure 21:
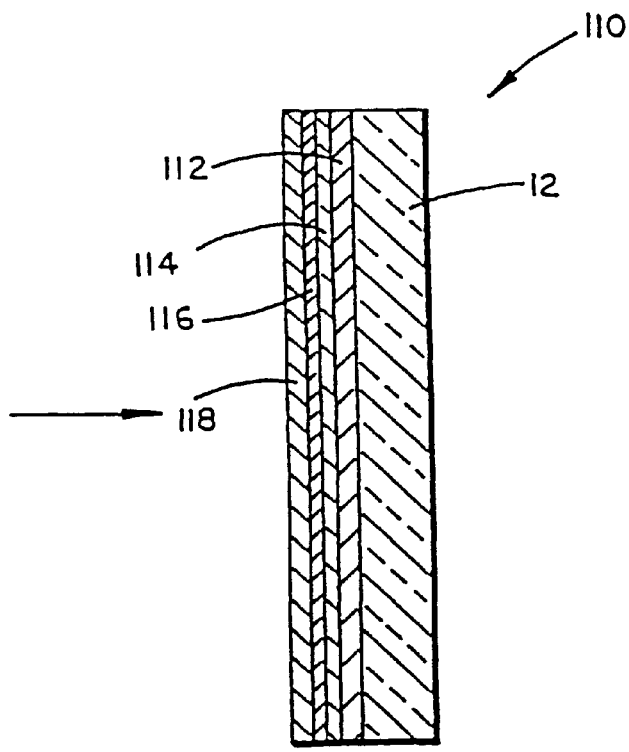
FIG. 21 is a sectional view of an twelfth embodiment of a first surface spectrally selective vehicular mirror of the present invention.

An alternate embodiment 110 of a first surface, spectrally selective, blue mirror similar to mirror 50 but including additional thin film opacification layers 116, 118 instead of a dark colored backing coating on glass substrate 12 is illustrated in FIG. 21. In mirror 110, two additional thin film layers are added to the front surface of the coated mirror. Thus, as shown in FIG. 21, a layer 112 of elemental silicon of an optical thickness of at least 4000 angstroms, and preferably at an optical thickness of between about 6800 and 10,000 angstroms, corresponding to a coating thickness of between about 1700 and 2500 angstroms at n=4, is deposited as in previous embodiments onto glass although other substrate materials could be used. This is followed by a silicon dioxide layer 114 of an optical thickness of about 1050 angstroms, corresponding to a coating thickness of about 700 angstroms at n=1.5, on the front surface of layer 112. In turn, layer 114 is followed by deposition of a second elemental silicon layer 116 of an optical thickness of about 800 angstroms, corresponding to a coating thickness of about 200 angstroms at n=4, followed by a second and final layer 118 of silicon dioxide having an optical thickness of about 2250 angstroms corresponding to a coating thickness of about 1500 angstroms at n=1.5.

Figure 22:
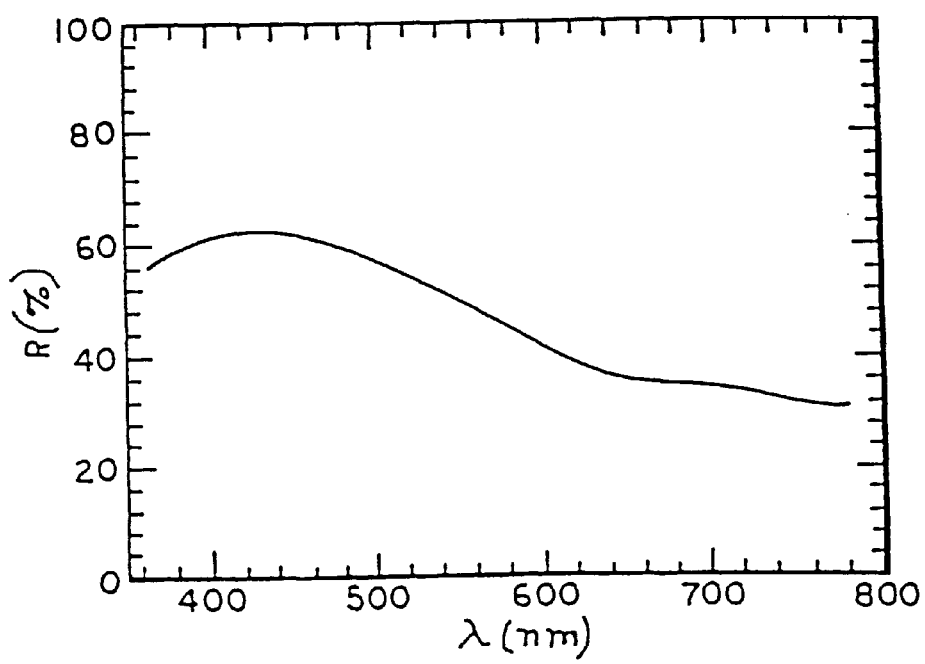
FIG. 22 is a graph of the spectral response of the mirror of FIG. 21 including a layer of elemental silicon having an optical thickness of about 6800 angstroms coated on glass, a layer of silicon dioxide in front of the silicon layer and having an optical thickness of about 1050 angstroms, a second layer of elemental silicon in front of the silicon dioxide and having an optical thickness of about 1800 angstroms, and a second layer of silicon dioxide in front of the second silicon layer and having an optical thickness of about 2250 angstroms.

The spectral reflectance of mirror 110 on glass with silicon layer 112 at an optical thickness of about 6,800 angstroms and layers 114, 116, 118 as described above is shown in FIG. 22 illustrating spectral selectivity in the blue regions of the visible spectrum and sufficiently high reflectance for use as an automotive rearview mirror. The color of mirror 110 in reflectance is blue and the luminous reflectance is 46.2%. In addition, mirror 110 is nearly opaque with a luminous transmittance of 0.1%. Such a low transmittance obviates the need for a black backing of any sort, such that mirror 110 is compatible with existing first surface rearview mirrors where adhesives are already available for securing the mirror to a mirror casing and assembly which may eventually be installed on a vehicle.

In general, opacification or near opacification using additional thin film means may require adjustment with respect to other layers of the construction, particularly in second surface constructions. However, by using opacification layers of elemental semiconductors and dielectric materials instead of other backing materials, the major advantage is realized of allowing heating and bending after coating on flat substrates.

As will now be apparent, in all embodiments of the mirrors herein, silicon nitride or other heatable and bendable dielectric materials which do not degrade upon heating may be substituted for silicon dioxide. Moreover, variations of the various optical and coating thicknesses for each of the mirrors can be used while maintaining good results.

As mentioned above, the application of heat to the single elemental semiconductor layers when coated on glass significantly improves the environmental and abrasion resistance for mirrors incorporating such a layer. For example, if first surface mirrors 10, 90 or 110 are desired to have improved scratch and abrasion resistance, it is beneficial to heat the coated substrates to temperatures of at least about 200° C. or so for a short period of time. Heating to such temperature is accomplished satisfactorily by, for example, increasing the temperature to 450° C. in an oven in less than one hour followed by decreasing that temperature in less than two hours to ambient/room temperatures while providing a relatively short soak time at the 450° C. level, i.e., between about 0 and 30 minutes. Lower temperatures could be used but require longer heating periods for equivalent results. After such heating, the elemental semiconductor coating on the substrate is environmentally resilient, hard and scratch resistant and, therefore, highly suitable for automotive rearview mirror use. Such heating can, for example, be conducted through a lehr heating conveyor line as is conventionally known.

Alternately, the improved hardness, resiliency and scratch resistance of the elemental semiconductor coating described above can be obtained by heating a sheet of glass to a temperature of about 200° C. prior to coating the glass with the elemental semiconductor. One surface of the heated glass sheet may then be coated with a thin layer of an elemental semiconductor such as silicon or germanium to a desired optical thickness of at least about 800 angstroms which will also cause the semiconductor coating to be environmentally hard, resilient and scratch resistant after the coated heated substrate cools.

Exemplary of the resiliency and scratch resistance of such coatings is a comparison of two otherwise identical elemental silicon thin films coated onto single strength soda-lime glass where one was retained as deposited and the other was conveyed through a lehr furnace having heating stages set for 550° C., 540° C. and 520° C. at a conveyor rate of 61 inches per minute. Both resultant coated glass substrates were abraded with an eraser stroke tester well known in the art. The sample which was heated in the Lehr furnace process showed about the same level of film damage at 3000 strokes of the tester as the unheated sample did at about 1000 strokes. Thus, although heating of the elemental silicon layers need not be done, when heating is employed, either with or without subsequent bending, the resistance to environmental damage is significantly improved making the improved coatings useful for rearview mirrors where high quality and durability standards are common.

Alternately, the production economics of producing the mirrors of the present invention are increased over prior known mirror production methods due to the ability to heat and bend the elemental semiconductor coating on glass without degrading the reflectivity thereof. For example, when the silicon film of one or more of the above mirror embodiments is coated onto flat glass, the glass may then be heated and bent in a conventional bending process without significant degradation of the silicon film, i.e., without crazing, cracking or hazing, or reduction in reflectance. Such bending is conventionally done by heating the glass up to a temperature of at least 450° C. or thereabouts, following by conforming the glass to a metallic or other mold all as is known to those in the art of glass bending. Alternately, shapes can be cut from large, flat coated glass lites, followed by use of the flat shapes as individual pieces or heating and bending of the individual pieces to form, for example, convex exterior rearview mirrors for automobiles. Alternately, bending can be done on the large, coated glass lites followed by cutting of the mirror shapes. The latter method is especially economical by allowing the vacuum sputter coating of silicon layers on large glass lites followed by heating to improve the resilience and scratch resistance of the layers after which the large glass lite can be either bent or cooled to allow cutting into individual mirror shapes. If the glass lite is bent subsequent to heating, the large bent glass lite can then be cut into individual shapes for use as desired. This method also allows the mass coating of numbers of large glass lites for retention in inventory until needed to produce individual flat mirror shapes or bent mirror shapes in one of the two processes described above.

It is also possible without degrading the reflective character of the mirror to produce curved mirrors by heating and bending after coating of the dielectric interference layers on top of or in combination with the elemental semiconductor layers of silicon or germanium again without cracking, hazing or crazing during such heating and bending. In addition, through the use of high temperature paint such as those mentioned above, the final light absorbing coating used to prevent secondary reflections may also be applied to the glass lites prior to heating and bending again without degradation of the coating during such processing. It has been found that during such heating and bending, the elemental semiconductor coating does not become converted to its oxide such as silicon dioxide where the refractive index would drop significantly as would the mirror reflectance. Rather, high temperature heating followed by bending of such substrates with combined coatings allows the refractive index to remain high in the elemental semiconductor layer such that mirrors of excellent reflective quality are produced all without cracking, crazing or hazing during heating and bending.

In addition, the above method permits in-line, sequential processing wherein sequential processing units are aligned to maximize manufacturing efficiency. For example, large glass sheets can be loaded onto a conveyor and washed in a glass cleaning unit which utilizes detergent-assisted face cleaning, clean deionized water rinsing and drying using air knives. This cleaned glass can be loaded into an in-line sputter coater where a thin elemental semiconductor coating can be applied to glass in one of several parallel or integrated manufacturing lines, i.e., one for flat mirror production, another for curved, coated glass lite production, one for the cutting of shapes followed by bending of individual shapes, and yet another for applying yet another coating to the glass that is on top of the already coated silicon layer such as an interference coating of dielectric material, namely, silicon dioxide or silicon nitride, as described above. Upon exiting the sputter coating chamber, the now elemental semiconductor coated large glass sheets are, alternately, cut into mini-lites or into shapes, are heated and bent before subsequent cutting, are cut into mini-lites before subsequent heating and bending, are subsequently sputter coated with one or more additional interference layers, or are coated with high temperature resistance or other protective, light absorbing paint. Depending on the type of paint, the shapes may then pass through a final baking station after which they are packed for customer use. The interference coating may also be applied to the opposite side of the substrate during such processing.

Finally, it is noted that for either large or individual sized glass lites coated with elemental semiconductor layers, such mirrors can be heated and bent in the manner described and stock-piled in inventory until needed. Thereafter, the additional dielectric interference layers can be sputter coated over the previously applied semiconductor layers to produce the spectrally selective mirrors described above.

As yet another alternative, it is possible to apply dielectric interference layers such as silicon nitride layer 82 in mirror 80 to a glass substrate or lite followed by heating and bending of that coated substrate with dielectric layer 82 thereon without crazing, cracking or hazing or other degradation of the dielectric layer. Thereafter, a layer of elemental silicon or germanium semiconductor may be sputter coated over top the previously applied dielectric layer as in layer 84 followed by the application of yet another dielectric layer such as layer 86 of silicon nitride where the first layer 62 is also of silicon nitride. Likewise, the additional, thin film opacification layers such as those at 44, 46 in mirror 40 or at 116, 118 in mirror 110 can also be applied before heating and bending without degradation by such further processing. Accordingly, the economic method of coating, heating and bending without degradation of the coating allows many and varied manufacturing processes for maximum efficiency.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

What is claimed is:

1. A high luminous reflectance mirrored substrate comprising:
   a glass substrate having first and second surfaces:
   a reflector coated upon said first surface of said glass substrate, said first surface adapted to face a source of light to be reflected;
   said reflector comprising a multilayer thin film stack comprising a first thin film layer of an elemental semiconductor which is closest to said first surface of said glass substrate and has a refractive index of greater than 3.0, a second thin film layer which is farthest from said first surface of said glass substrate, and a third thin film layer disposed between said first thin film layer and said second thin film layer, said third thin film layer having a refractive index between about 1.3 and 2.7, said second thin film layer having a refractive index greater than said third thin film layer;
   said reflector having a light reflectance of at least about 60% of light incident thereon at the wavelength region of about 550 nanometers and being achromatic; and
   a light absorbing coating on at least one of a surface of said glass substrate and a layer of said reflector, said light absorbing coating absorbing light transmitted by said reflector coated substrate.

2. The mirrored substrate of claim 1 wherein said elemental semiconductor thin film layer comprises one of silicon and germanium.

3. The mirrored substrate of claim 1 wherein said elemental semiconductor thin film layer comprises silicon.

4. The mirrored substrate of claim 3 wherein said light absorbing coating is disposed between said first thin film layer and said first surface of said glass substrate.

5. The mirrored substrate of claim 3 wherein said light absorbing coating is disposed on said second surface of said glass substrate.

6. The mirrored substrate of claim 3 wherein said light absorbing coating comprises one of a paint, a lacquer, a tape, a ceramic, a hot melt plastic, a resinous plastic, a plastisol or an epoxy material.

7. The mirrored substrate of claim 6 wherein said light absorbing coating provides antiscatter protection for said glass substrate should it be broken.

8. The mirrored substrate of claim 3 wherein the luminous transmittance of said light absorbing coated mirrored substrate is less than about 4%.

9. The mirrored substrate of claim 1 wherein said light absorbing coating comprises one of a paint and a lacquer.

10. The mirrored substrate of claim 1 wherein said light absorbing coating comprises a tape.

11. The mirrored substrate of claim 1 wherein said third thin film layer comprises one of an oxide, fluoride, nitride, and sulfide.

12. The mirrored substrate of claim 1 wherein said third thin film layer comprises a silicon compound.

13. The mirrored substrate of claim 12 wherein said silicon compound comprises silicon nitride.

14. The mirrored substrate of claim 12 wherein said silicon compound comprises silicon oxide.

15. The mirrored substrate of claim 1 wherein at least one of said first thin film layer and said second thin film layer comprises doped silicon.

16. The mirrored substrate of claim 15 wherein said doped silicon is doped with a material selected from the group consisting of phosphorous, aluminum, gallium, boron and arsenic.

17. The mirrored substrate of claim 1 wherein at least one of said first thin film layer, said second thin film layer, and said third thin film layer is a non-vacuum coated layer.

18. The mirrored substrate of claim 17 wherein said non-vacuum coated layer is one of a dip-coated layer and a spin-coated layer.

19. The mirrored substrate of claim 1 wherein said glass substrate is a bent glass substrate having a curvature.

20. The mirrored substrate of claim 19 wherein said bent glass substrate has a generally convex surface and a generally concave surface.

21. The mirrored substrate of claim 20 wherein said reflector is coated on said convex surface.

22. The mirrored substrate of claim 19 wherein said reflector is coated on said concave surface.

23. The mirrored substrate of claim 19 wherein said bent glass substrate has a radius of curvature of at least about forty (40) inches.

24. The mirrored substrate of claim 19 wherein said bent glass substrate is heated to at least about 450° C. following coating of said reflector and bent to said curvature after heating.

25. The mirrored substrate of claim 1 wherein said glass substrate is heated and bent following coating of said reflector on said first surface of said glass substrate.

26. The mirrored substrate of claim 1 wherein said mirrored substrate is a reflector suitable for use in a rearview mirror for a vehicle.

27. The mirrored substrate of claim 26 wherein said mirrored substrate is a reflector of an exterior rearview mirror on a vehicle.

28. The mirrored substrate of claim 27 wherein the vehicle is an automobile.

29. The mirrored substrate of claim 27 wherein the vehicle is a truck.

* * * * *